United States Patent
Kawasaki et al.

(10) Patent No.: US 9,583,934 B2
(45) Date of Patent: Feb. 28, 2017

(54) EXCITATION INRUSH CURRENT SUPPRESSION DEVICE

(71) Applicant: KABUSHIKI KAISHA TOSHIBA, Minato-ku, Tokyo (JP)

(72) Inventors: Kei Kawasaki, Yokohama (JP);
Tadashi Koshizuka, Saitama (JP);
Shiro Maruyama, Yokohama (JP);
Minoru Saito, Kamaukura (JP);
Noriyuki Nagayama, Tokorozawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 528 days.

(21) Appl. No.: 14/164,122

(22) Filed: Jan. 24, 2014

(65) Prior Publication Data
US 2014/0139959 A1 May 22, 2014

Related U.S. Application Data

(63) Continuation of application No. PCT/JP2012/068959, filed on Jul. 26, 2012.

(30) Foreign Application Priority Data

Jul. 27, 2011 (JP) .................. 2011-164090

(51) Int. Cl.
*H02H 3/26* (2006.01)
*H02H 9/00* (2006.01)

(52) U.S. Cl.
CPC ............ *H02H 3/265* (2013.01); *H02H 9/002* (2013.01)

(58) Field of Classification Search
CPC ............................... H02H 3/265; H02H 9/002
(Continued)

(56) References Cited

U.S. PATENT DOCUMENTS

| 2009/0134862 A1 | 5/2009 | Kinoshita et al. |
| 2010/0141235 A1 | 6/2010 | Koshiduka et al. |
| 2011/0181989 A1* | 7/2011 | Udagawa ............... H02H 9/002 |
| | | 361/35 |

FOREIGN PATENT DOCUMENTS

| CN | 101447664 A | 6/2009 |
| CN | 101563744 A | 10/2009 |

(Continued)

OTHER PUBLICATIONS

Extended European Search Report dated Mar. 3, 2015, issued in counterpart European Application No. 12816924.0.
(Continued)

*Primary Examiner* — Thienvu Tran
*Assistant Examiner* — Kevin J Comber
(74) *Attorney, Agent, or Firm* — Holtz, Holtz & Volek PC

(57) ABSTRACT

According to one embodiment, an excitation inrush current suppression device for suppressing excitation inrush currents flowing through a breaker of the three-phase collective operation type for opening and closing connection is configured to measure a three-phase AC voltage of the power supply bus bar to calculate prospective magnetic fluxes of the transformer, and to measure a three-phase AC voltage on the transformer side to calculate residual magnetic fluxes of the transformer after shutoff, so as to set the breaker closed when polarities of the prospective magnetic fluxes respectively agree with polarities of the residual magnetic fluxes in all of the phases respectively.

4 Claims, 20 Drawing Sheets

(58) Field of Classification Search
USPC .......................................................... 361/85
See application file for complete search history.

(56) References Cited

FOREIGN PATENT DOCUMENTS

| EP | 2091058 A1 | 8/2009 |
|---|---|---|
| JP | 63046713 A | 2/1988 |
| JP | 3-132436 A | 6/1991 |
| JP | 8-230523 A | 9/1996 |
| JP | 2002-075145 A | 3/2002 |
| JP | 2004153932 A | 5/2004 |
| JP | 2007288873 A | 11/2007 |
| JP | 2008-140580 A | 6/2008 |
| JP | 2008-160100 A | 7/2008 |
| WO | WO 2008/065757 A1 | 6/2008 |

OTHER PUBLICATIONS

Japanese Office Action dated Feb. 24, 2015, issued in counterpart Japanese Application No. 2011-164090.
Morimoto, et al., "New Type of Feeding Transformer for AC Railway Traction System", 2009 International Conference on Power Electronics and Drive Systems (PEDS), Nov. 1, 2009, pp. 800-805.
English translation of an International Preliminary Report on Patentability (IPRP) including Written Opinion dated Feb. 6, 2014 in parent International Application No. PCT/JP2012/068959.
Chinese Office Action (and English translation thereof) dated Jun. 10, 2015, issued in counterpart Chinese Application No. 201280028824.9.
European Office Action dated Feb. 15, 2016, issued in counterpart European Application No. 12816924.0.
Brunke et al., "Elimination of Transformer Inrush Currents by Controlled Switching—Part I: Theoretical Considerations", IEEE Transactions on Power Delivery, vol. 16, No. 2, Apr. 2001, pp. 276-280 (in English).
International Search Report (ISR) dated Nov. 6, 2012 (and English translation thereof) issued in counterpart International Application No. PCT/JP2012/068959.
U.S. Appl. No. 13/769,066, First Named Inventor: Kei Kawasaki, Title: "Magnetizing Inrush Current Suppression Apparatus", filed Feb. 15, 2013.
U.S. Appl. No. 12/516,717, First Named Inventor: Tadashi Koshiduka, Title: "Magnetizing Inrush Current Suppression Device and Method for Transformer", filed May 28, 2009.
U.S. Appl. No. 13/773,372, First Named Inventor: Keisuke Udagawa, Title: "Magnetizing Inrush Current Suppression Apparatus", filed Feb. 21, 2013.
Australian Office Action dated Jun. 15, 2015, issued in counterpart Australian Application No. 2012287861.

* cited by examiner

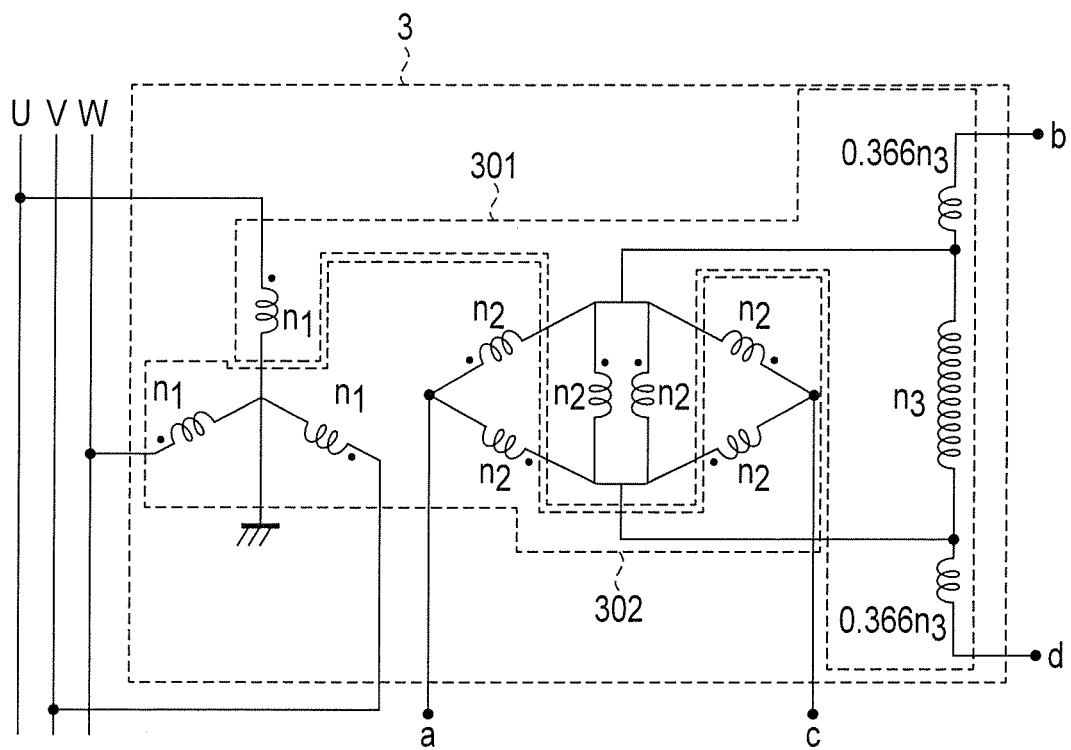
F I G. 2
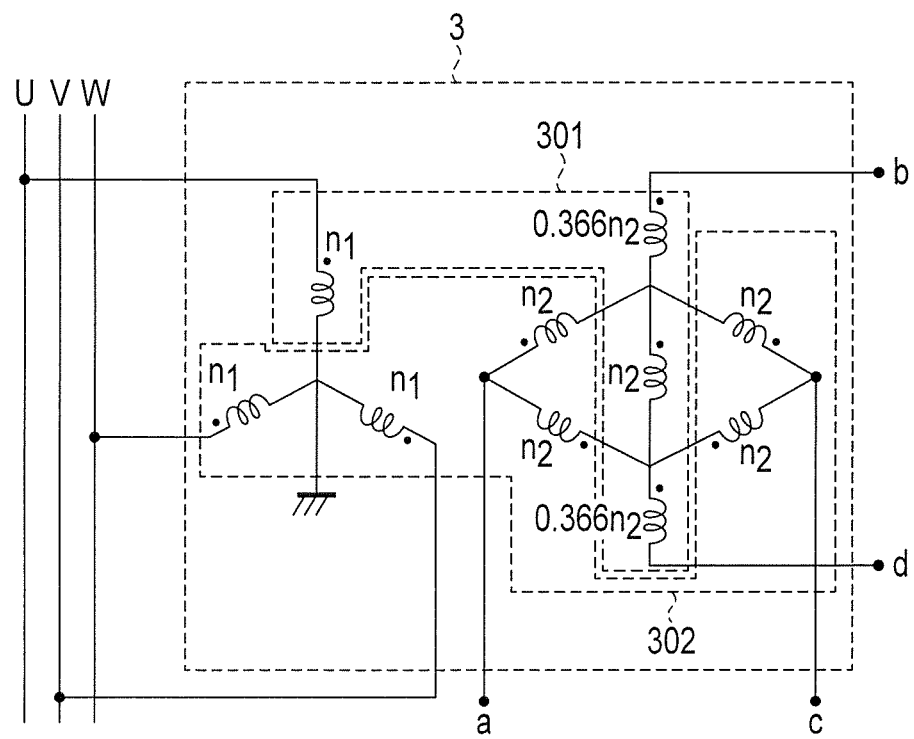
F I G. 3

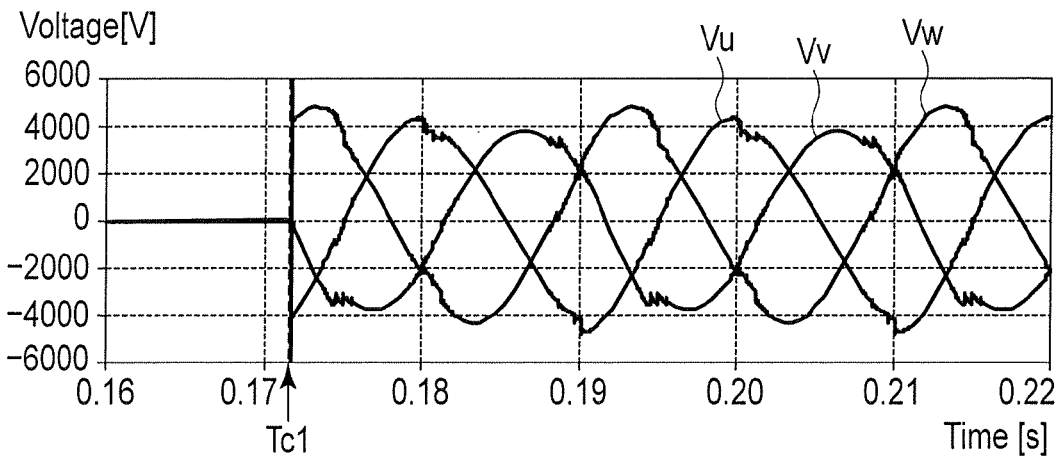
F I G. 13
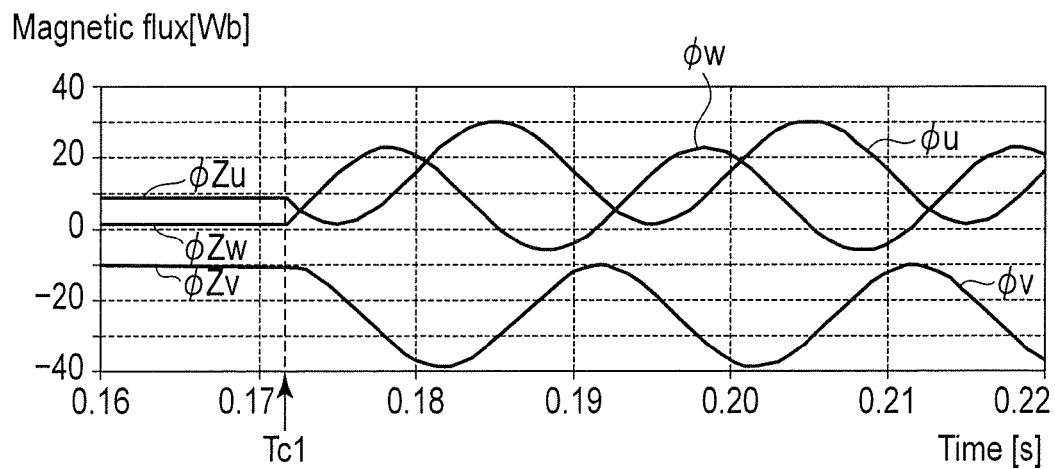
F I G. 14
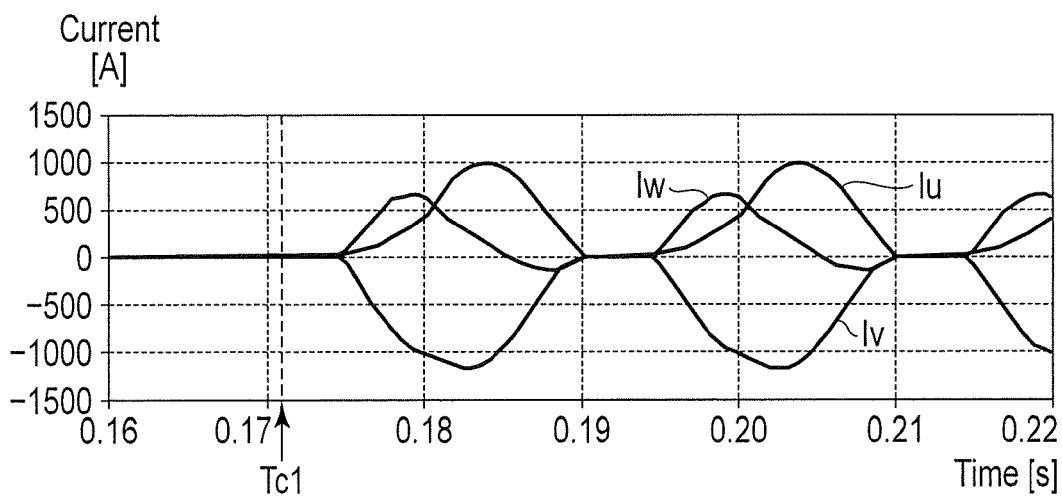
F I G. 15

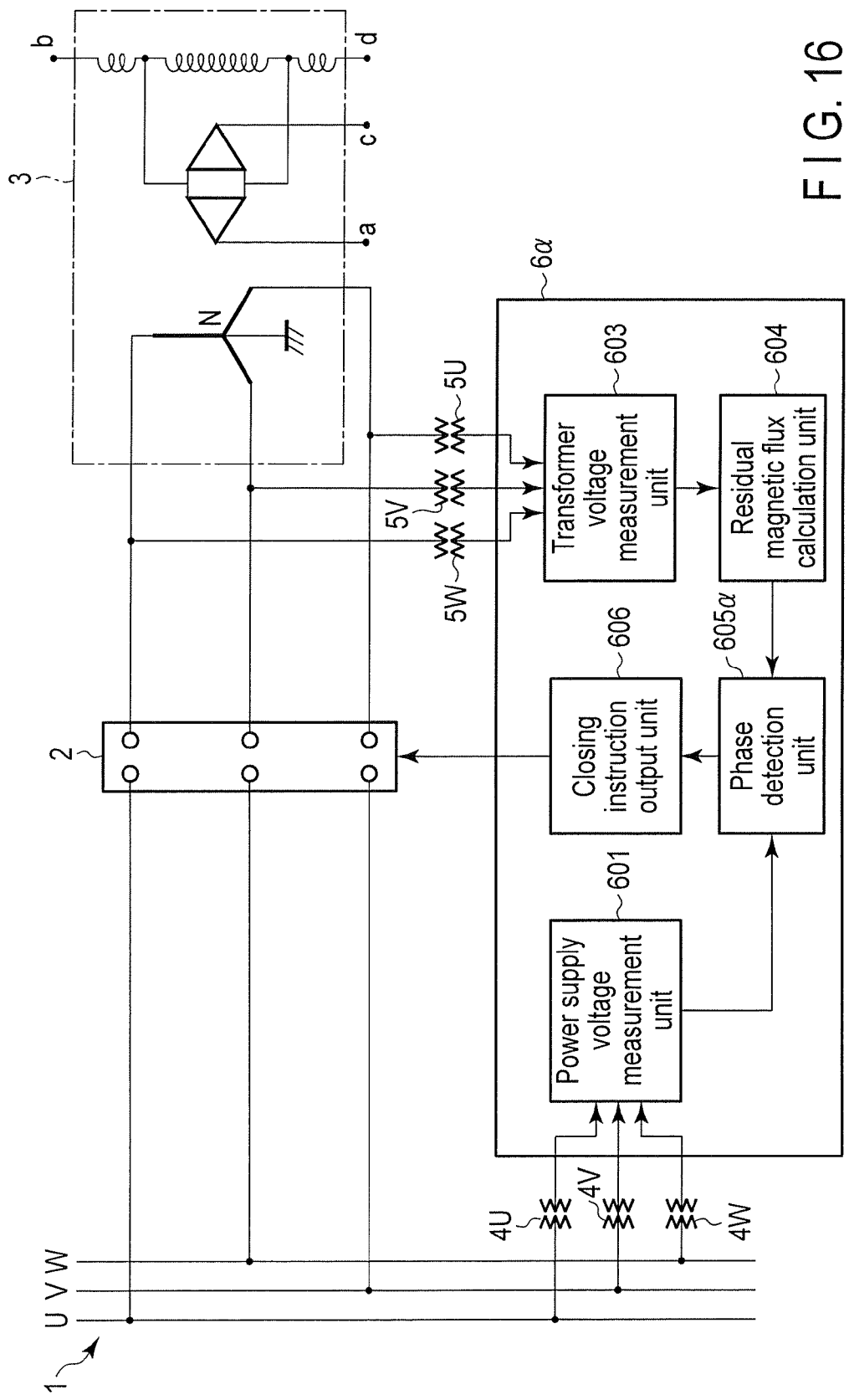
F I G. 16

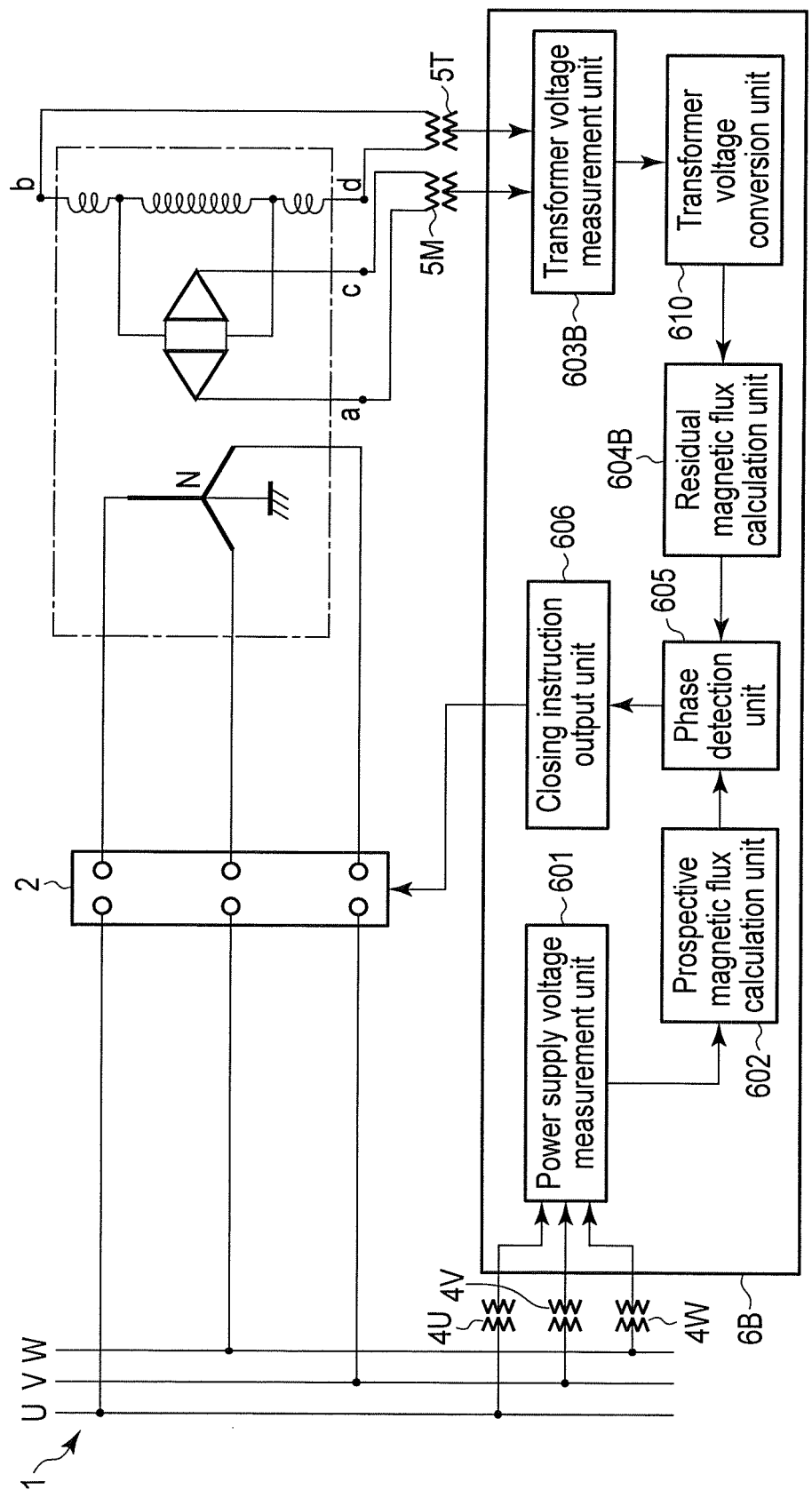
F I G. 19

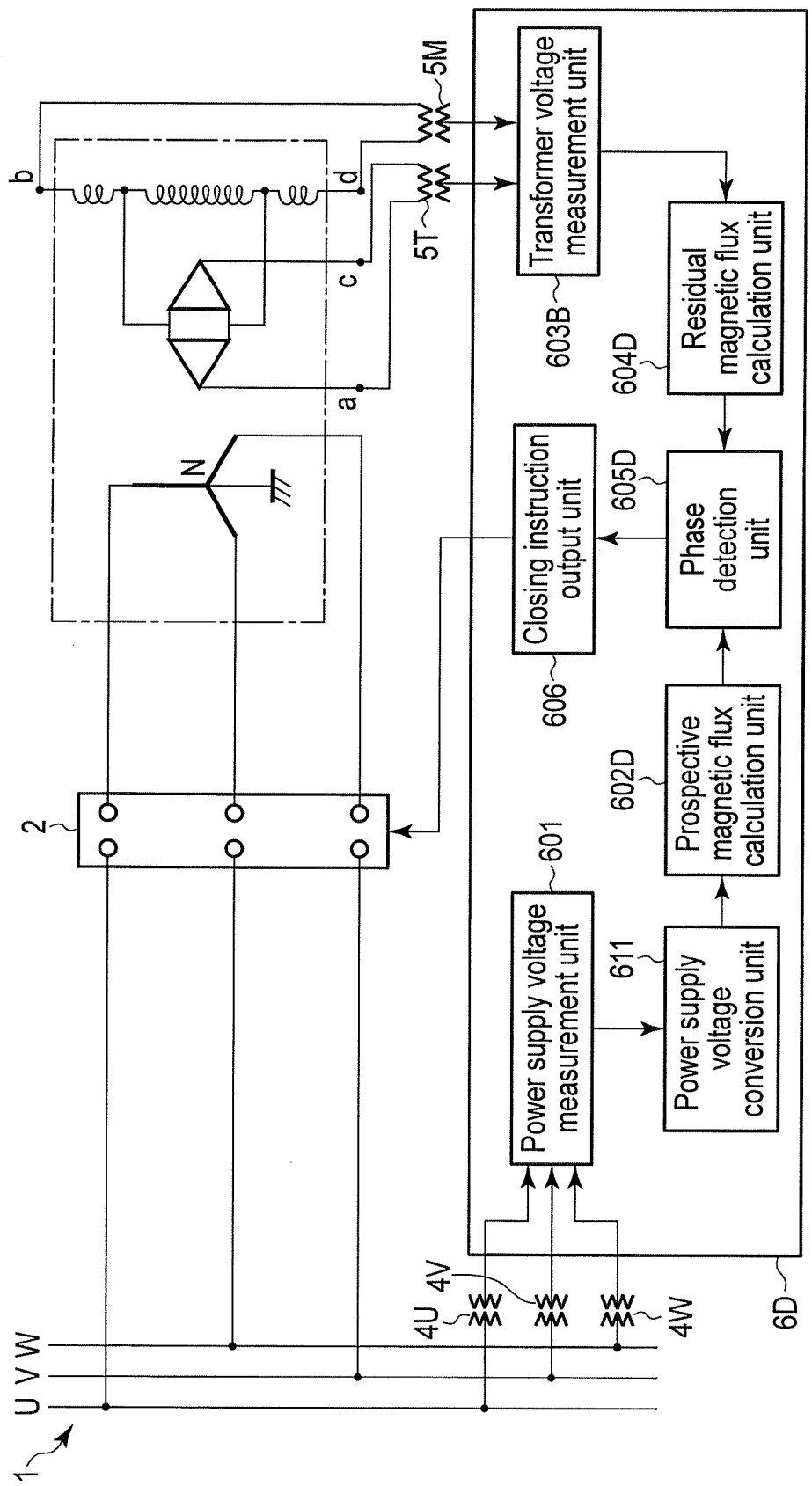
F I G. 24

EXCITATION INRUSH CURRENT SUPPRESSION DEVICE

CROSS-REFERENCE TO RELATED APPLICATIONS

This application is a Continuation application of PCT Application No. PCT/JP2012/068959, filed Jul. 26, 2012 and based upon and claiming the benefit of priority from Japanese Patent Application No. 2011-164090, filed Jul. 27, 2011, the entire contents of all of which are incorporated herein by reference.

FIELD

Embodiments described herein relates generally to an excitation inrush current suppression device for suppressing excitation inrush currents generated when a breaker is set closed.

BACKGROUND

It is known in general that, when a transformer is in a state where a residual magnetic flux is present in its iron core, and it is supplied with power to perform no-load excitation, large excitation inrush currents are caused to flow. The excitation inrush currents reach a level several times larger than the rated load current of the transformer. If such large excitation inrush currents flow, the system voltage fluctuates and may affect the consumers when the voltage fluctuation is large.

Accordingly, as a method for suppressing excitation inrush currents of this kind, it is known to use a resistor-equipped breaker in which a closing resistor and a contact are connected in series. The resistor-equipped breaker is connected in parallel with the main contact of a breaker. This resistor-equipped breaker is set closed in advance of the main contact of the breaker. Consequently, the excitation inrush currents are suppressed.

As another suppression method, there is known a method for a three-phase transformer of the directly grounded type, which is supplied with power by three breakers of the single-phase operation type, wherein the method suppresses excitation inrush currents in activating the transformer by first closing an arbitrary one of the breakers of the three phases and then closing the other breakers of the remaining two phases.

Further, there is known a method for a three-phase transformer of the non-effectively grounded type, which is supplied with power by a breaker of the three-phase collective operation type, wherein the method suppresses excitation inrush currents in activating the transformer by measuring the values of residual magnetic fluxes present in the iron core at shutoff of the transformer and then controlling the closing phase position of the breaker.

On the other hand, as a method for converting a three-phase AC (alternate current) voltage to single-phase AC voltages, a Scott connection, Woodbridge connection transformer, and modified Woodbridge connection are known. Transformers of these connection types are used for supplying power to, e.g., single-phase electric furnaces or single-phase AC electric vehicles.

However, the above-described methods for suppressing excitation inrush currents have problems, as follows.

In the case of the excitation inrush current suppression method using a resistor-equipped breaker, since the resistor-equipped breaker needs to be added to an ordinary breaker, the entire breaker system becomes larger.

Further, none of the excitation inrush current suppression methods pays attention to activation of a transformer that converts a three-phase AC voltage to single-phase AC voltages, as mentioned above.

For example, in the case of the method that measures residual magnetic fluxes and then controls the closing phase position of the breaker, the manner of controlling a three-phase transformer for power systems cannot be applied as is to a transformer that converts a three-phase AC voltage to single-phase AC voltages. This is so because transformers of these connection types are structured such that magnetic fluxes present in the transformer iron core cannot be calculated simply by measuring the phase voltages or line voltages on the three-phase AC side.

PRIOR ART REFERENCE

Patent Document

[Patent Document 1]
Jpn. Pat. Appln. KOKAI Publication No. 2002-75145
[Patent Document 2]
Jpn. Pat. Appln. KOKAI Publication No. 2008-160100
[Patent Document 3]
Jpn. Pat. Appln. KOKAI Publication No. 2008-140580

Non-Patent Document

[Non-Patent Document 1]
John H. Brunke et al., "Elimination of Transformer Inrush Currents by Controlled Switching—Part I: Theoretical Considerations", IEEE TRANSACTIONS ON POWER DELIVERY, IEEE, April, 2001, Vol. 16, No. 2, p.276-280

Under the circumstances, it is desired to provide an excitation inrush current suppression device for a breaker configured to open and close the connection between a three-phase AC power system including a power supply and a transformer that converts a three-phase AC voltage to single-phase AC voltages, wherein the device can control the closing phase position of the breaker to suppress excitation inrush currents.

BRIEF DESCRIPTION OF THE DRAWINGS

FIG. 2 is a block diagram showing the configuration of a modified Woodbridge connection transformer according to the first embodiment;

FIG. 3 is a block diagram showing the configuration of a Woodbridge connection transformer according to the first embodiment;

FIG. 13 is a waveform diagram showing the primary side phase voltages before and after the modified Woodbridge connection transformer is supplied with power from the power supply bus bar by a conventional breaker;

FIG. 14 is a waveform diagram showing the primary side phase magnetic fluxes before and after the modified Woodbridge connection transformer is supplied with power from the power supply bus bar by the conventional breaker;

FIG. 15 is a waveform diagram showing the primary side phase currents before and after the modified Woodbridge connection transformer is supplied with power from the power supply bus bar by the conventional breaker;

FIG. 16 is a block diagram showing the configuration of an electric power system to which an excitation inrush current suppression device according to a modification of the first embodiment is applied;

FIG. 19 is a block diagram showing the configuration of an electric power system to which an excitation inrush current suppression device according to a third embodiment of the present invention is applied;

FIG. 24 is a block diagram showing the configuration of an electric power system to which an excitation inrush current suppression device according to a fifth embodiment of the present invention is applied;

DETAILED DESCRIPTION

Embodiments will be described with reference to the drawings.

In general, according to one embodiment, there is provided an excitation inrush current suppression device for suppressing excitation inrush currents flowing through a breaker for opening and closing connection between a three-phase AC power system including a power supply and an effectively grounded transformer that converts a three-phase AC voltage to single-phase AC voltages. The device comprises a transformer-side three-phase AC voltage measurement unit configured to measure a three-phase AC voltage on a transformer-side of the breaker, a residual magnetic flux calculation unit configured to perform calculation, based on the three-phase AC voltage measured by the transformer-side three-phase AC voltage measurement unit, to calculate residual magnetic fluxes of three phases of the transformer after the transformer is shut off by the breaker, a power supply-side three-phase AC voltage measurement unit configured to measure a three-phase AC voltage on a power supply-side of the breaker, a prospective magnetic flux calculation unit configured to perform calculation, based on the three-phase AC voltage measured by the power supply-side three-phase AC voltage measurement unit, to calculate prospective magnetic fluxes of the three phases of the transformer, a phase position determination unit configured to determine a phase position at which polarities of the prospective magnetic fluxes of the three phases calculated by the prospective magnetic flux calculation unit respectively agree with polarities of the residual magnetic fluxes of the three phases calculated by the residual magnetic flux calculation unit in all of the three phases respectively, and a closing unit configured to set the breaker closed, for the three phases all together, at the phase position determined by the phase position determination unit.

First Embodiment

Figure 1:
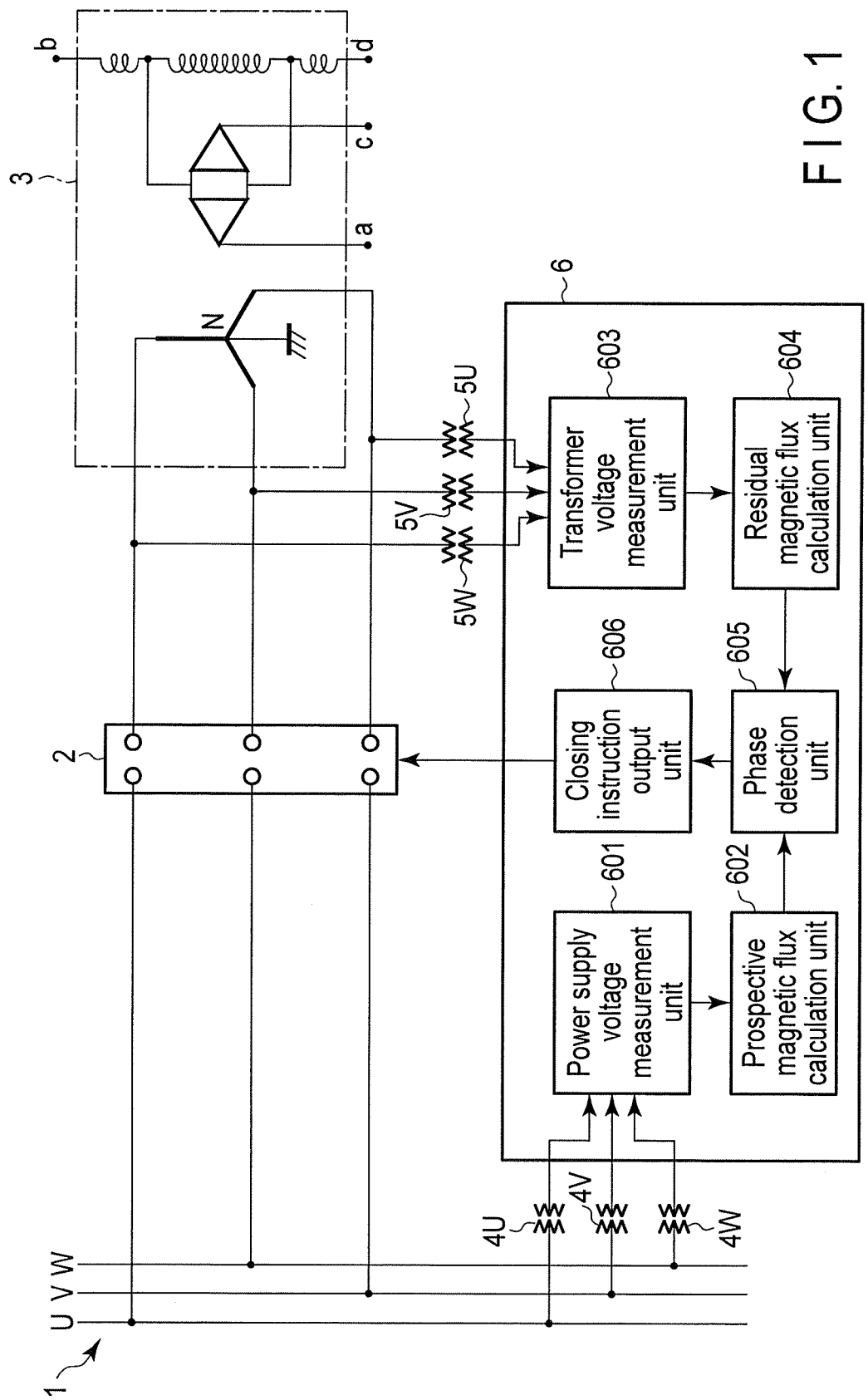
FIG. 1 is a block diagram showing the configuration of an electric power system to which an excitation inrush current suppression device according to a first embodiment of the present invention is applied.

FIG. 1 is a block diagram showing the configuration of an electric power system to which an excitation inrush current suppression device 6 according to a first embodiment of the present invention is applied. In the drawings mentioned hereinafter, the same portions are denoted by the same reference symbols to omit their repetitive detailed description and to mainly describe different portions. The other embodiments explained later are also described in the same way to omit repetitive description.

The electric power system according to this embodiment comprises a power supply bus bar (the bus bar of a power system) 1, a breaker 2, a modified Woodbridge connection transformer 3, power supply voltage detectors 4U, 4V, and 4W provided to the power supply bus bar 1 respectively for the three phases, transformer primary side voltage detectors 5U, 5V, and 5W provided to the primary side of the modified Woodbridge connection transformer 3 respectively for the three phases, and an excitation inrush current suppression device 6.

The power supply bus bar 1 is the bus bar of a power system including a three-phase AC power supply having a U-phase, V-phase, and W-phase.

The modified Woodbridge connection transformer 3 is connected to the power supply bus bar 1 through the breaker 2. The modified Woodbridge connection transformer 3 is installed in an effectively grounded system. The modified Woodbridge connection transformer 3 is configured to convert a three-phase AC voltage supplied from the power supply bus bar 1 to the single-phase AC voltages of two sections. In the modified Woodbridge connection transformer 3, the three-phase AC side is the primary side and the single-phase AC side is the secondary side. In place of the modified Woodbridge connection transformer 3, a Woodbridge connection transformer, which is based on the same transforming principle, may be used. Accordingly, in the explanation hereinafter (and in the other embodiments explained later), the modified Woodbridge connection transformer 3 may be replaced with a Woodbridge connection transformer, unless otherwise differentiated.

The breaker 2 is disposed between the power supply bus bar 1 and the modified Woodbridge connection transformer 3. The breaker 2 is a breaker of the three-phase collective operation type configured to operate all the main contacts of the three phases, i.e., the U-phase, V-phase, and W-phase, together. When the breaker 2 is set closed, the modified Woodbridge connection transformer 3 is supplied with power from the power supply bus bar 1. When the breaker 2 is set open, the modified Woodbridge connection transformer 3 is shut off from the power supply bus bar 1 (electric connection cutoff).

The three power supply voltage detectors 4U, 4V, and 4W are measuring instruments configured to respectively measure the phase voltages of the U-phase, V-phase, and W-phase (voltages relative to ground) on that side of the breaker 2 which is closer to the power supply bus bar 1. The power supply voltage detectors 4U, 4V, and 4W are instrument voltage transformers (VT, Voltage Transformer), for example. The power supply voltage detectors 4U, 4V, and 4W output detection values, as detection signals, to the excitation inrush current suppression device 6.

The three transformer primary side voltage detectors 5U, 5V, and 5W are measuring instruments configured to respectively measure the terminal voltages of the terminals (of the U-phase, V-phase, and W-phase) on the primary side of the modified Woodbridge connection transformer 3, i.e., on that side of the breaker 2 which is closer to the transformer 3. The transformer primary side voltage detectors 5U, 5V, and 5W are instrument voltage transformers, for example. The transformer primary side voltage detectors 5U, 5V, and 5W output detection values, as detection signals, to the excitation inrush current suppression device 6.

The excitation inrush current suppression device 6 receives detection signals respectively from the power supply voltage detectors 4U, 4V, and 4W and the transformer primary side voltage detectors 5U, 5V, and 5W, and, based thereon, outputs a closing instruction Tc1 to the main contacts of the breaker 2. Consequently, the breaker 2 is set closed.

FIG. 2 is a block diagram showing the configuration of the modified Woodbridge connection transformer 3 according to this embodiment.

The modified Woodbridge connection transformer 3 includes a main transformer 302 and a teaser transformer 301.

The main transformer 302 includes two winding wires having the same number of turns on the secondary side. The teaser transformer 301 is connected to an auto-transformer including a winding wire that renders a ratio of 1:0.366:0.366 in the number of turns on the secondary side. In the modified Woodbridge connection transformer 3, the secondary sides of the main transformer 302 and the teaser transformer 301 are connected to each other back to back by use of two delta-connected winding wires.

Next, an explanation will be given of a case where the transformer 3 is the Woodbridge connection type.

FIG. 3 is a block diagram showing the configuration of a Woodbridge connection transformer 3 according to this embodiment.

The Woodbridge connection transformer 3 comprises a teaser transformer 301 including a winding wire that renders a ratio of 1:0.366:0.366 in the number of turns on the secondary side, in place of the auto-transformer used in the modified Woodbridge connection type. In all other respects, the Woodbridge connection transformer 3 is the same in structure as the modified Woodbridge connection transformer 3.

Figure 4:
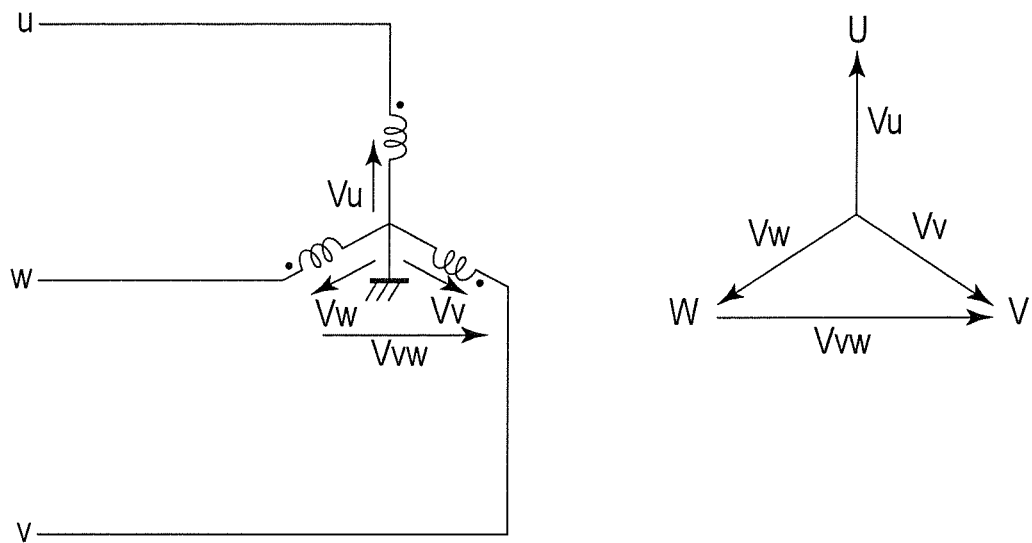
FIG. 4 is a vector graphic view showing, by use of vectors, the primary side phase voltages of the modified Woodbridge connection transformer according to the first embodiment.
Figure 5:
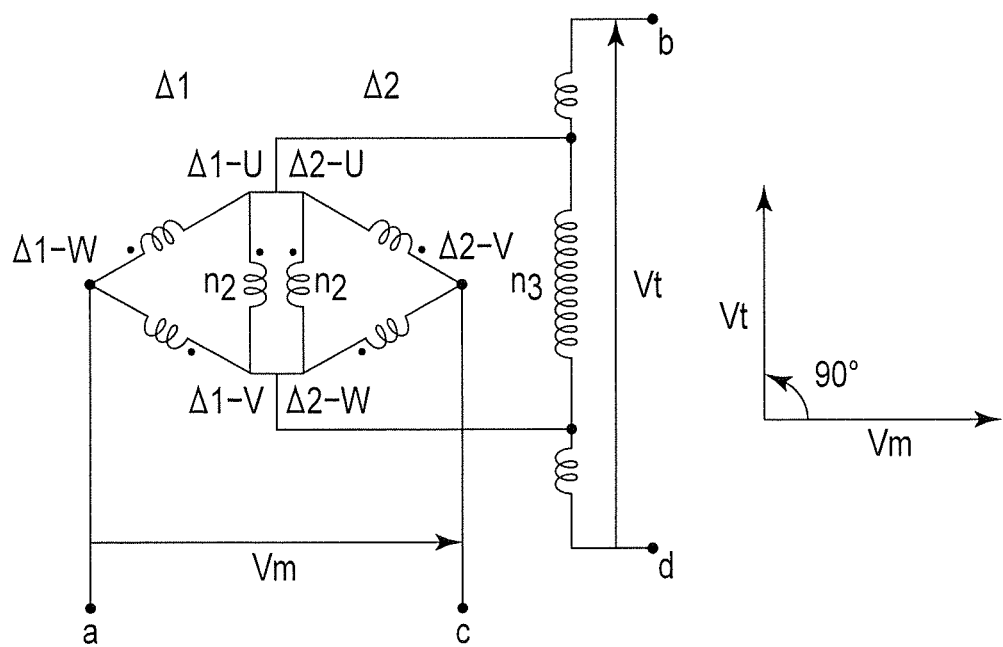
FIG. 5 is a vector graphic view showing, by use of vectors, the secondary side voltages of the modified Woodbridge connection transformer according to the first embodiment.

FIG. 4 is a vector graphic view showing, by use of vectors, the primary side phase voltages Vu, Vv, and Vw of the modified Woodbridge connection transformer 3 according to this embodiment. FIG. 5 is a vector graphic view showing, by use of vectors, the secondary side voltages Vt and Vm of the modified Woodbridge connection transformer 3 according to the this embodiment.

The voltage Vvw between the V and W phases on the primary side is the same in phase as the voltage applied between the secondary side terminals "c" and "a" of the main transformer 302 (the secondary side voltage of the main section) Vm. The U-phase voltage Vu on the primary side is the same in phase as the voltage applied between the secondary side terminals "b" and "d" of the teaser transformer 301 (the secondary side voltage of the teaser section) Vt. Accordingly, the secondary side voltage of the teaser section Vt advances in phase by 90° relative to the secondary side voltage Vm of the main section.

Figure 6:
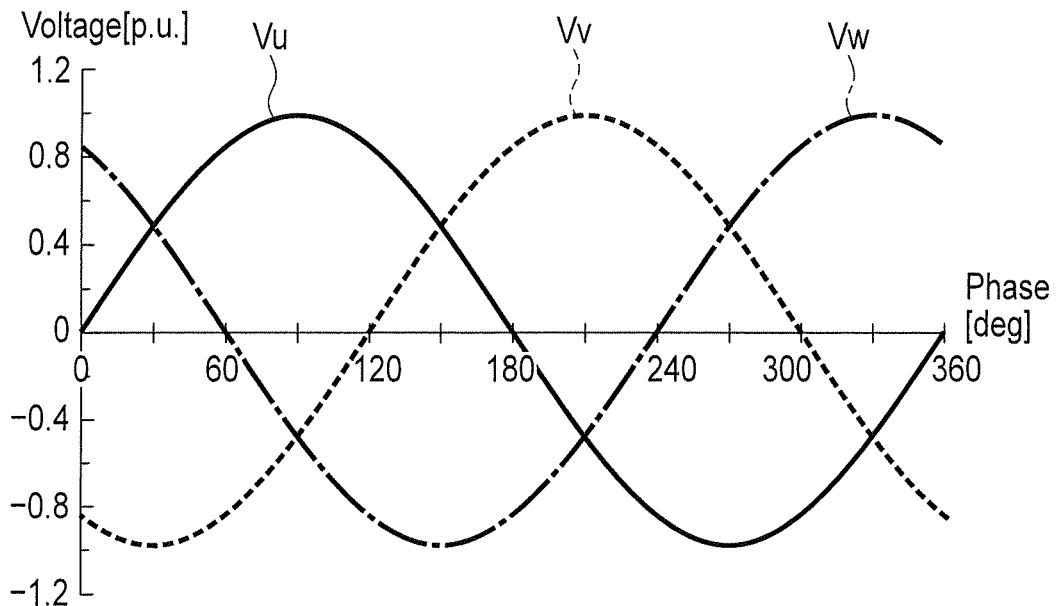
FIG. 6 is a waveform diagram showing the respective voltage waveforms of the phase voltages measured by a power supply voltage measurement unit according to the first embodiment.
Figure 7:
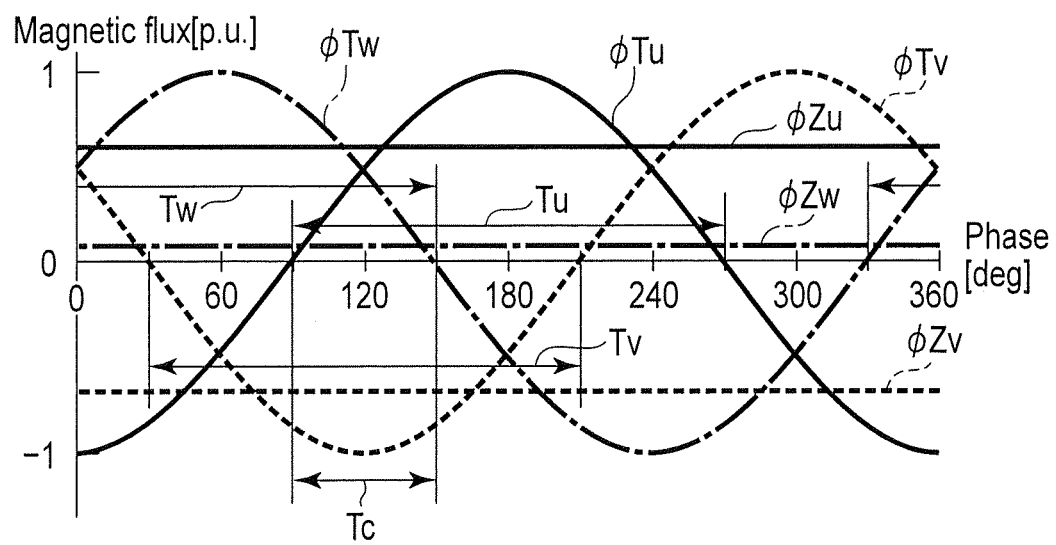
FIG. 7 is a waveform diagram showing magnetic flux waveforms to explain a closing target phase region associated with the excitation inrush current suppression device according to the first embodiment.

FIG. 6 is a waveform diagram showing the respective voltage waveforms of the phase voltages Vu, Vv, and Vw measured by a power supply voltage measurement unit 601 according to the this embodiment. FIG. 7 is a waveform diagram showing magnetic flux waveforms to explain a closing target phase region Tc associated with the excitation inrush current suppression device 6 according to this embodiment.

With reference to FIGS. 1, 6, and 7, the configuration of the excitation inrush current suppression device 6 will be explained.

The excitation inrush current suppression device 6 comprises the power supply voltage measurement unit 601, a prospective magnetic flux calculation unit 602, a transformer voltage measurement unit 603, a residual magnetic flux calculation unit 604, a phase detection unit 605, and a closing instruction output unit 606.

Based on detection signals detected by the power supply voltage detectors 4U, 4V, and 4W, the power supply voltage measurement unit 601 measures the respective phase voltages Vu, Vv, and Vw of the power supply bus bar 1. The power supply voltage measurement unit 601 outputs the respective phase voltages Vu, Vv, and Vw thus measured to the prospective magnetic flux calculation unit 602.

The prospective magnetic flux calculation unit 602 integrates each of the phase voltages Vu, Vv, and Vw measured by the power supply voltage measurement unit 601. Based on the integrated values, the prospective magnetic flux calculation unit 602 calculates magnetic fluxes in a prospective (prospective magnetic fluxes) $\phi$Tu, $\phi$Tv, and $\phi$Tw. The prospective magnetic flux calculation unit 602 outputs the prospective magnetic fluxes $\phi$Tu, $\phi$Tv, and $\phi$Tw thus calculated to the phase detection unit 605.

Based on detection signals detected by the transformer primary side voltage detectors 5U, 5V, and 5W, the transformer voltage measurement unit 603 measures the respective phase voltages Vu, Vv, and Vw on the primary side of the modified Woodbridge connection transformer 3. The transformer voltage measurement unit 603 outputs the respective phase voltages Vu, Vv, and Vw thus measured to the residual magnetic flux calculation unit 604.

Based on the respective phase voltages Vu, Vv, and Vw measured by the transformer voltage measurement unit 603, the residual magnetic flux calculation unit 604 integrates each of the phase voltages Vu, Vv, and Vw of the U-phase, V-phase, and W-phase before and after the modified Woodbridge connection transformer 3 is shut off by the breaker 2. Based on the integrated values, the residual magnetic flux calculation unit 604 calculates residual magnetic fluxes present in the iron core of the modified Woodbridge connection transformer 3 (primary side phase magnetic fluxes) $\phi$Zu, $\phi$Zv, and $\phi$Zw. The residual magnetic flux calculation unit 604 outputs the residual magnetic fluxes $\phi$Zu, $\phi$Zv, and $\phi$Zw thus calculated to the phase detection unit 605.

As shown in FIG. 7, the phase detection unit 605 detects phase zones Tu, Tv, and Tw for the respective phases in which the prospective magnetic fluxes $\phi$Tu, $\phi$Tv, and $\phi$Tw calculated by the prospective magnetic flux calculation unit 602 and the residual magnetic fluxes $\phi$Zu, $\phi$Zv, and $\phi$Zw calculated by the residual magnetic flux calculation unit 604 respectively agree with each other in polarity. The phase detection unit 605 identifies a zone Tc in which all of the three phase zones Tu, Tv, and Tw detected for the respective phases overlap each other. This identified zone Tc is a closing target phase region for closing the breaker 2. The phase detection unit 605 outputs the closing target phase region (zone) Tc thus detected to the closing instruction output unit 606.

The closing instruction output unit 606 outputs a closing instruction Tc1, within the closing target phase region Tc detected by the phase detection unit 605, to the operation mechanism for driving the main contacts of the breaker 2. Consequently, the breaker 2 is set closed.

Next, with reference to FIGS. 8 to 12, an explanation will be given of suppression of excitation inrush currents by use of the excitation inrush current suppression device 6.

Figure 8:
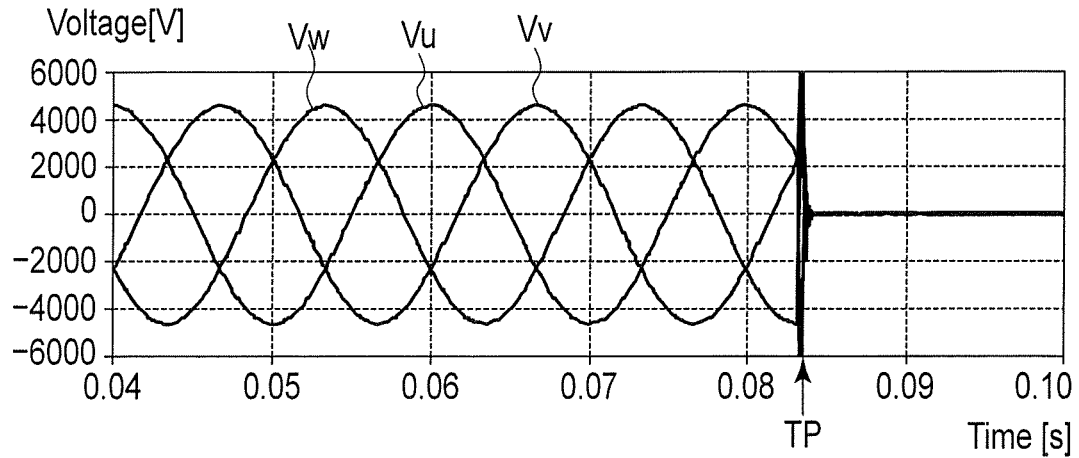
FIG. 8 is a waveform diagram showing the primary side phase voltages before and after the modified Woodbridge connection transformer is shut off by a breaker according to the first embodiment.
Figure 9:
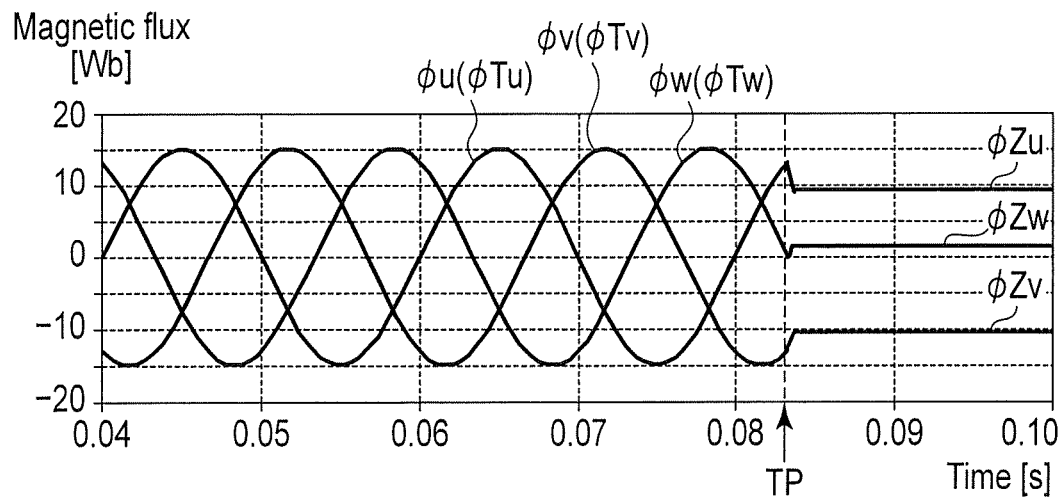
FIG. 9 is a waveform diagram showing the primary side phase magnetic fluxes before and after the modified Woodbridge connection transformer is shut off by the breaker according to the first embodiment.

FIGS. 8 and 9 show an example of the states of the modified Woodbridge connection transformer 3 before and after it is shut off Tp by the breaker 2. FIG. 8 is a waveform diagram showing the primary side phase voltages Vu, Vv, and Vw. FIG. 9 is a waveform diagram showing the primary side phase magnetic fluxes $\phi$u, $\phi$v, and $\phi$w.

Figure 10:
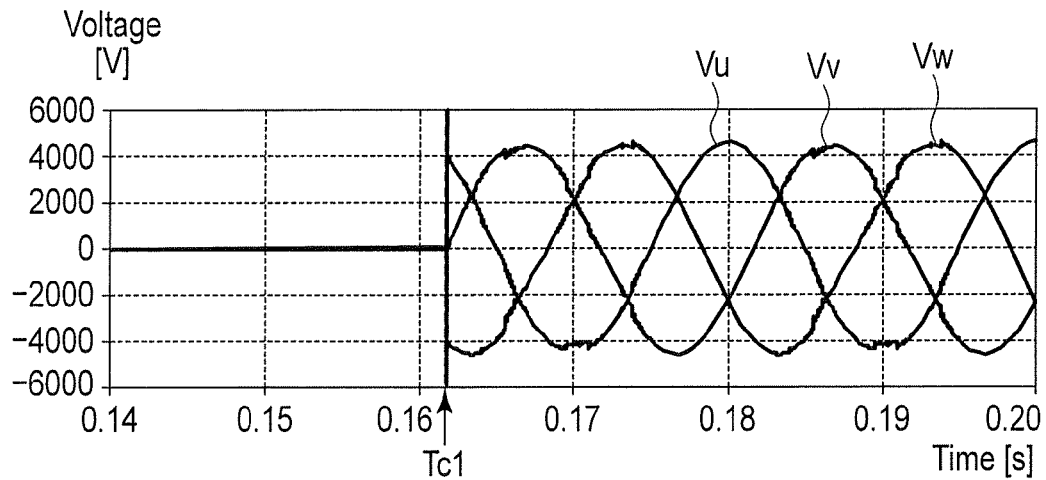
FIG. 10 is a waveform diagram showing the primary side phase voltages before and after the modified Woodbridge connection transformer is supplied with power from the power supply bus bar by the breaker according to the first embodiment.
Figure 11:
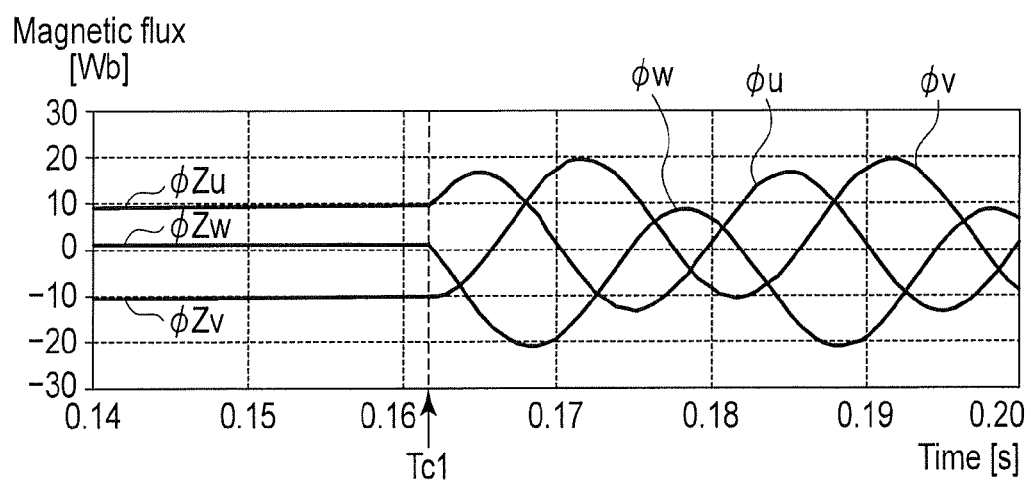
FIG. 11 is a waveform diagram showing the primary side phase magnetic fluxes before and after the modified Woodbridge connection transformer is supplied with power from the power supply bus bar by the breaker according to the first embodiment.
Figure 12:
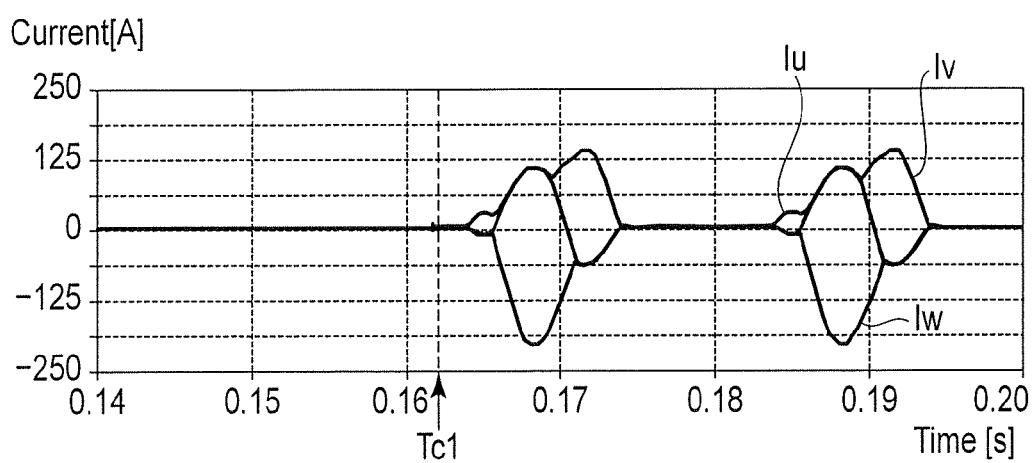
FIG. 12 is a waveform diagram showing the primary side phase currents before and after the modified Woodbridge connection transformer is supplied with power from the power supply bus bar by the breaker according to the first embodiment.

FIGS. 10 to 12 show an example of the states of the modified Woodbridge connection transformer 3 before and after it is supplied with power from the power supply bus bar 1 by the breaker 2 (by a closing instruction Tc1). FIG. 10 is a waveform diagram showing the primary side phase voltages Vu, Vv, and Vw. FIG. 11 is a waveform diagram showing the primary side phase magnetic fluxes $\phi$u, $\phi$v, and $\phi$w. FIG. 12 is a waveform diagram showing the primary side phase currents (excitation inrush currents) Iu, Iv, and Iw.

In a case where the three-phase AC voltages Vu, Vv, and Vw shown in FIG. 8 are applied to the primary side of the modified Woodbridge connection transformer 3, and when the breaker 2 is set open, the residual magnetic fluxes $\phi$Zu ($\phi$u), $\phi$Zv ($\phi$v), and $\phi$Zw ($\phi$w) shown in FIG. 9 are present after the shutoff Tp.

When the breaker 2 is set closed by the excitation inrush current suppression device 6 within the closing target phase region Tc shown in FIG. 7, the primary side phase magnetic fluxes $\phi$u, $\phi$v, and $\phi$w shown in FIG. 11 appear relative to the primary side phase voltages Vu, Vv, and Vw shown in FIG. 10. At this closing of the breaker 2, the excitation inrush currents Iu, Iv, and Iw shown in FIG. 12 are generated. These excitation inrush currents Iu, Iv, and Iw reach a level of about 200 [A] at maximum.

Next, for comparison, with reference to FIGS. 13 to 15, an example will be given of the excitation inrush currents Iu, Iv, and Iw in relation to the breaker 2 without the use of the excitation inrush current suppression device 6 (the closing is not performed within the closing target phase region Tc).

FIGS. 13 to 15 show an example of the states of the modified Woodbridge connection transformer 3 before and after it is supplied with power from the power supply bus bar 1 by a conventional closing method (by a closing instruction Tc1). FIG. 13 is a waveform diagram showing the primary side phase voltages Vu, Vv, and Vw. FIG. 14 is a waveform diagram showing the primary side phase magnetic fluxes $\phi$u, $\phi$v, and $\phi$w. FIG. 15 is a waveform diagram showing the primary side phase currents (excitation inrush currents) Iu, Iv, and Iw. The conditions associated with FIGS. 13 to 15 are the same as the conditions associated with FIGS. 8 to 12 except for the closing phase position to the breaker 2.

As shown in FIG. 15, when the breaker 2 is set closed without the use of phase position control by the excitation inrush current suppression device 6, the excitation inrush currents Iu, Iv, and Iw reach a level close to about 1,200 [A] at maximum.

According to this embodiment, the excitation inrush current suppression device 6 serves such that the modified Woodbridge connection transformer 3 is supplied with power by the breaker 2 within a phase zone in which the polarities of the prospective magnetic fluxes φTu, φTv, and φTw respectively agree with the polarities of the residual magnetic fluxes φZu, φZv, and φZw in all of the three phases respectively. Since the modified Woodbridge connection transformer 3 is supplied with power from the supply bus bar 1 by use of the closing phase position control in this way, it is possible to suppress excitation inrush currents.

In the case of a three-phase transformer of the non-effectively grounded type, if there is a difference in current shutoff phase positions, a DC (direct current) voltage may remain at the neutral point N. In this case, the DC voltage is superposed on the phase voltages, and so residual magnetic fluxes in the winding wires cannot be exactly calculated by use of integration operations of the phase voltages.

On the other hand, in the case of a three-phase transformer of the effectively grounded type, the voltages applied to the winding wires are equal to the phase voltages. Accordingly, as in this embodiment, the residual magnetic fluxes can be exactly calculated by use of integration operations of the phase voltages.

Modification of First Embodiment

FIG. 16 is a block diagram showing the configuration of an electric power system to which an excitation inrush current suppression device 6α according to a modification of the first embodiment is applied.

The excitation inrush current suppression device 6α according to this modification is configured such that the excitation inrush current suppression device 6 according to the first embodiment shown in FIG. 1 is altered by replacing the phase detection unit 605 with a phase detection unit 605α and excluding the prospective magnetic flux calculation unit 602. In all other respects, this device 6α is the same in structure as the excitation inrush current suppression device 6 according to the first embodiment.

An explanation will be given of a method of closing the breaker 2 by the phase detection unit 605α.

The phase detection unit 605α detects a phase with the largest residual magnetic flux among the residual magnetic fluxes φZu, φZv, and φZw calculated by the residual magnetic flux calculation unit 604. It further detects the voltage zero point at which the phase voltage of this detected phase at the power supply bus bar 1 shifts from the same polarity to the reverse polarity relative to the residual magnetic flux of this phase (i.e., the largest residual magnetic flux). The phase detection unit 605α outputs the voltage zero point thus detected, as a closing target phase region Tc, to the closing instruction output unit 606. The closing instruction output unit 606 regards, as a closing phase target, the closing target phase region Tc (i.e., the voltage zero point) detected by the phase detection unit 605α, and outputs a closing instruction Tc1 to the breaker 2.

For example, in the case of the state shown in FIGS. 6 and 7, the residual magnetic flux φZv of the V-phase is the largest residual magnetic flux. The residual magnetic flux φZ of the V-phase has a polarity on the negative side. Accordingly, the phase detection unit 605α identifies the voltage zero point, at which the V-phase voltage Vv shifts from the negative side to the positive side, as a closing target phase region Tc.

This modification provides functions and effects, as follows.

As shown in FIGS. 6 and 7, the voltage zero point detected by the phase detection unit 605α consequently comes to be almost at the center of the phase zone in which the polarities of the prospective magnetic fluxes φTu, φTv, and φTw respectively agree with the polarities of the residual magnetic fluxes φZu, φZv, and φZw in all of the three phases respectively. Accordingly, this modification provides the same functions and effects as the first embodiment. Further, the phase detection unit 605α identifies a closing target phase region Tc without using the prospective magnetic fluxes φTu, φTv, and φTw. Accordingly, this modification has a configuration that excludes the prospective magnetic flux calculation unit 602.

In the explanation described above, the zero point of a phase voltage having the largest residual magnetic flux is detected, but the zero point of a line voltage corresponding to this phase may be alternatively detected. For example, if the U-phase has the largest residual magnetic flux, detection may be made of the voltage zero point at which the U-V line voltage corresponding to the U-phase shifts from the same polarity to the reverse polarity relative to the residual magnetic flux of the U-phase.

The phase differences between the phase voltages and the line voltages are 30°. Accordingly, even if the comparison is made by use of a line voltage in place of a phase voltage that is originally preferable for use in the comparison, it is possible to obtain the effect of suppressing excitation inrush currents, because their phase difference is about 30°.

Second Embodiment

Figure 17:
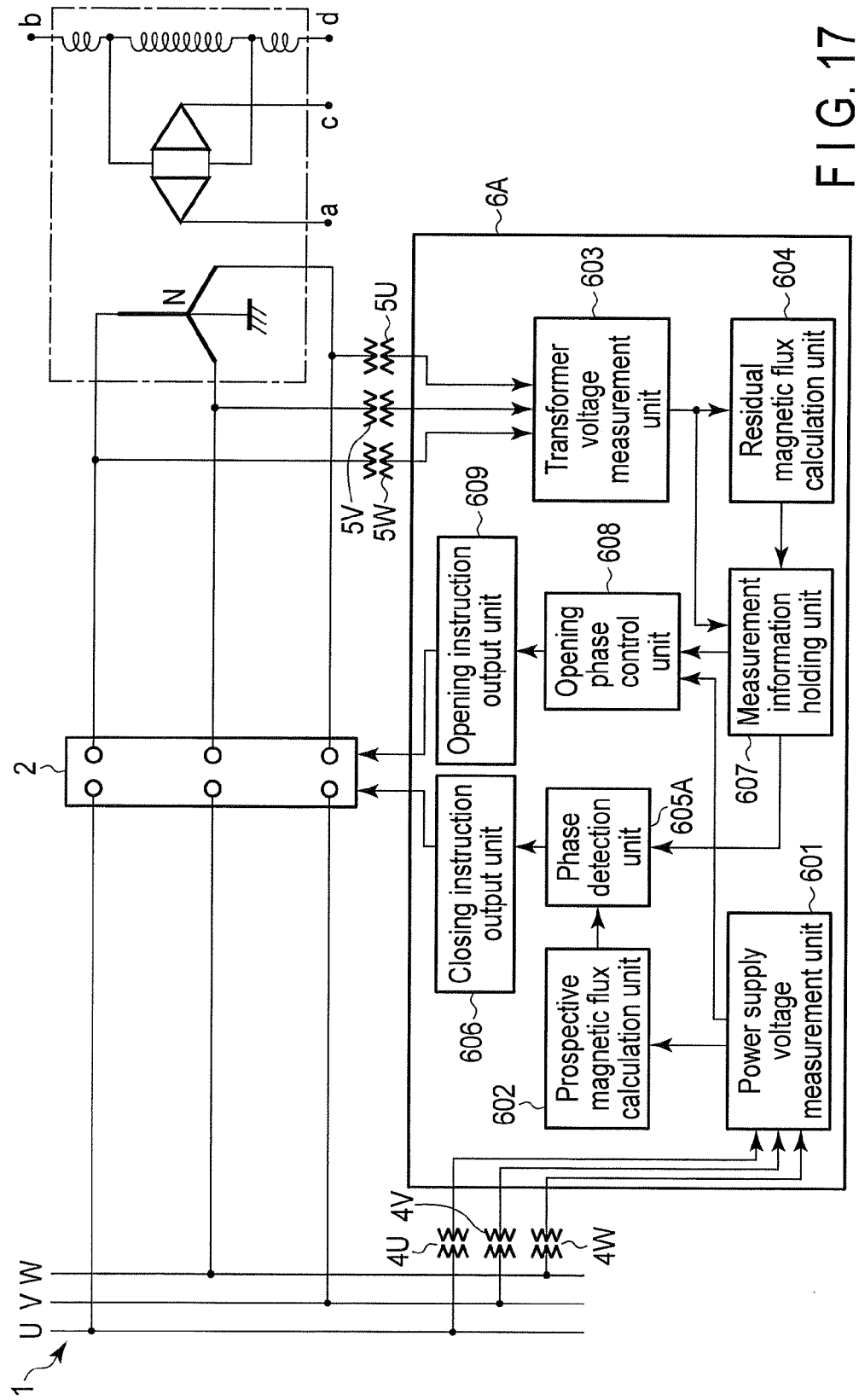
FIG. 17 is a block diagram showing the configuration of an electric power system to which an excitation inrush current suppression device according to a second embodiment of the present invention is applied.

FIG. 17 is a block diagram showing the configuration of an electric power system to which an excitation inrush current suppression device 6A according to a second embodiment of the present invention is applied.

The excitation inrush current suppression device 6A is configured such that the excitation inrush current suppression device 6 according to the first embodiment shown in FIG. 1 is altered by replacing the phase detection unit 605 with a phase detection unit 605A and adding a measurement information holding unit 607, an opening phase control unit 608, and an opening instruction output unit 609. In all other respects, this device 6A is the same in structure as the excitation inrush current suppression device 6 according to the first embodiment.

Before the excitation inrush current suppression device 6A is placed in operation, the measurement information holding unit 607 measures the voltage shutoff phase positions of the primary side voltages measured by the transformer voltage measurement unit 603, and magnetic flux signals calculated by the residual magnetic flux calculation unit 604, in a case where the breaker 2 is shut off a plurality of times (at least one time). Based on the voltage shutoff phase positions and the magnetic flux signals thus measured, the measurement information holding unit 607 holds information concerning the characteristics of residual magnetic fluxes, such as the relationship between the shutoff phase positions and the residual magnetic fluxes, as measurement information.

The opening phase control unit 608 receives inputs about the measurement information held in the measurement information holding unit 607 and the respective phase voltages Vu, Vv, and Vw of the power supply bus bar 1 measured by the power supply voltage measurement unit 601. Based on the respective phase voltages Vu, Vv, and Vw, the opening phase control unit 608 controls the opening phase positions of the main contacts of the breaker 2 to cause the shutoff phase positions to be constantly the same. The opening phase control unit 608 outputs the opening phase positions thus controlled to the opening instruction output unit 609.

The opening instruction output unit 609 receives the opening phase positions from the opening phase control unit 608, and, based thereon, outputs opening instructions to the operation mechanism for driving the main contacts of the breaker 2. Consequently, the breaker 2 is set open.

The phase detection unit 605A receives inputs about the measurement information held in the measurement information holding unit 607 and the prospective magnetic fluxes φTu, φTv, and φTw of the respective phases calculated by the prospective magnetic flux calculation unit 602. From the measurement information held in the measurement information holding unit 607, the phase detection unit 605A estimates residual magnetic fluxes φZu, φZv, and φZw of the respective phases. Based on the residual magnetic fluxes φZu, φZv, and φZw and the prospective magnetic fluxes φTu, φTv, and φTw, the phase detection unit 605A identifies a closing target phase region Tc for closing the breaker 2. The method for identifying the closing target phase region Tc is the same as that in the first embodiment.

In this case, the opening phase control unit 608 performs phase position control to cause the shutoff phase positions to be constantly the same. Accordingly, as long as the information held in the measurement information holding unit 607 is not changed (i.e., the measurement information is not renewed), the phase detection unit 605A can constantly use the same closing target phase region Tc.

This embodiment provides functions and effects, as follows.

After the breaker 2 and the modified Woodbridge connection transformer 3 are once installed in a power system, the circuit conditions of this power system (the circuit conditions from the power supply bus bar 1 to the modified Woodbridge connection transformer 3) are unchanged. Accordingly, if the shutoff phase positions of the breaker 2 is caused to be constantly the same, the residual magnetic fluxes φZu, φZv, and φZw of the respective phases in the modified Woodbridge connection transformer 3 should constantly have the same values.

When the modified Woodbridge connection transformer 3 is shut off by the breaker 2, the excitation inrush current suppression device 6A controls the opening phase positions of the breaker 2 to cause the shutoff phase positions to be constantly the same. In other words, the excitation inrush current suppression device 6A can cause the residual magnetic fluxes φZu, φZv, and φZw of the respective phases to constantly have the same values. Accordingly, when the excitation inrush current suppression device 6A sets the breaker 2 closed to excite the modified Woodbridge connection transformer 3, it can cause the closing target phase region Tc, for suppressing excitation inrush currents, to be constantly the same in phase position.

Accordingly, even if the transformer primary side voltage detectors 5U, 5V, and 5W are not continuously connected, the excitation inrush current suppression device 6A can always obtain information about the residual magnetic fluxes φZu, φZv, and φZw in the modified Woodbridge connection transformer 3 after shutoff by the breaker 2, based on the measurement information held in the measurement information holding unit 607. Accordingly, the transformer primary side voltage detectors 5U, 5V, and 5W may be attached only when measurement is performed by use of the measurement information holding unit 607, and they may be detached in the ordinary operation state. As a matter of course, the transformer primary side voltage detectors 5U, 5V, and 5W may be installed permanently.

Modification of Second Embodiment

Figure 18:
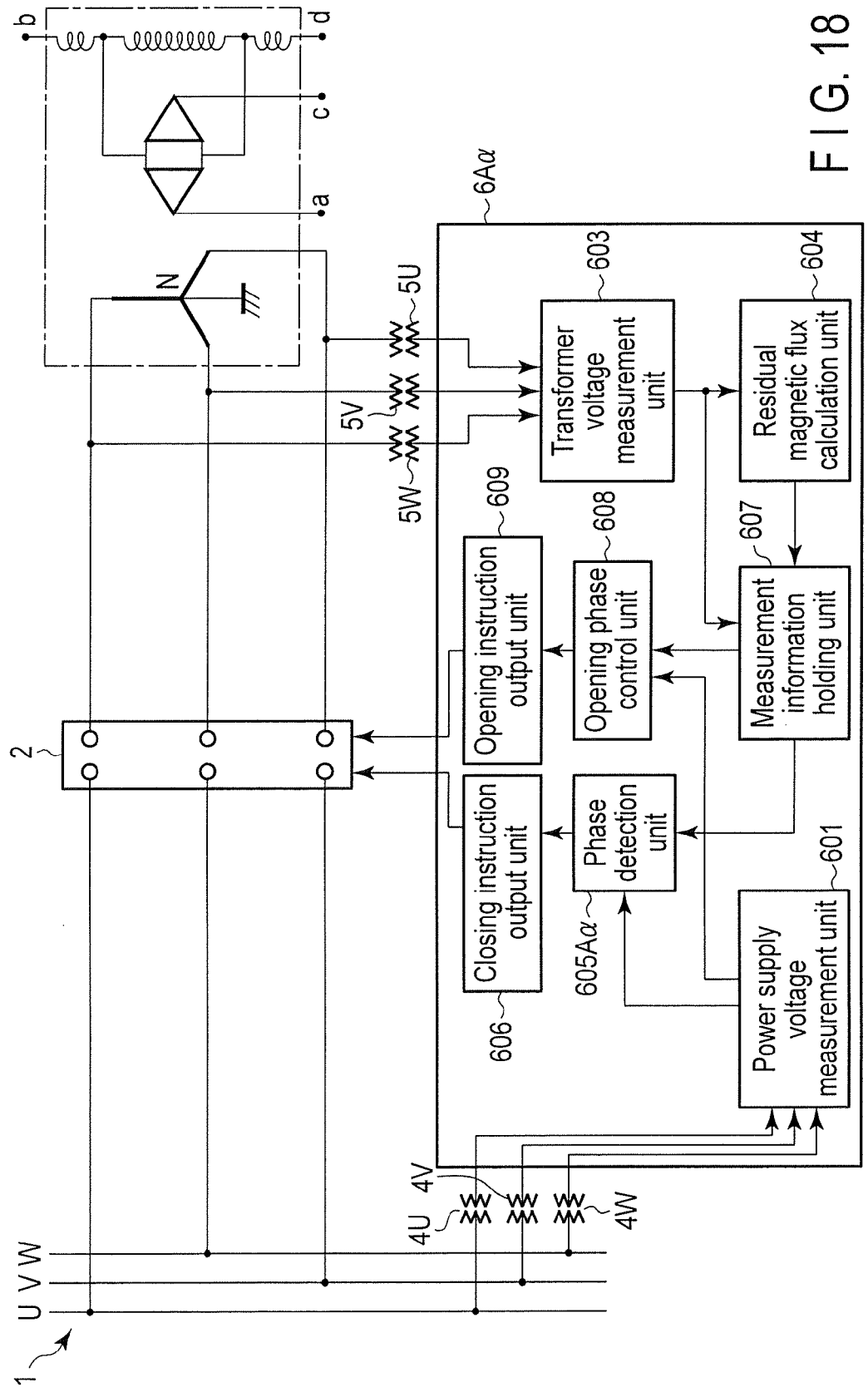
FIG. 18 is a block diagram showing the configuration of an electric power system to which an excitation inrush current suppression device according to a modification of the second embodiment is applied.

FIG. 18 is a block diagram showing the configuration of an electric power system to which an excitation inrush current suppression device 6Aα according to a modification of the second embodiment is applied.

The excitation inrush current suppression device 6Aα according to this modification is configured such that the excitation inrush current suppression device 6A according to the second embodiment shown in FIG. 17 is altered by replacing the phase detection unit 605A with a phase detection unit 605Aα and excluding the prospective magnetic flux calculation unit 602. In all other respects, this device 6Aα is the same in structure as the excitation inrush current suppression device 6A according to the second embodiment.

The phase detection unit 605Aα uses the same closing method of the breaker 2 as that in the phase detection unit 605α according to the modification of the first embodiment. In all other respects, the phase detection unit 605Aα is the same as the phase detection unit 605A according to the second embodiment.

Specifically, from the measurement information held in the measurement information holding unit 607, the phase detection unit 605Aα estimates residual magnetic fluxes φZu, φZv, and φZw of the respective phases. The phase detection unit 605Aα detects a phase with the largest residual magnetic flux among the residual magnetic fluxes φZu, φZv, and φZw thus estimated. Based on the detected phase, the phase detection unit 605Aα identifies a closing target phase region Tc, as in the modification of the first embodiment.

This modification provides the functions and effects provided by the modification of the first embodiment in addition to the functions and effects provided by the second embodiment.

Third Embodiment

FIG. 19 is a block diagram showing the configuration of an electric power system to which an excitation inrush current suppression device 6B according to a third embodiment of the present invention is applied.

The electric power system according to this embodiment is configured such that the electric power system according to the first embodiment shown in FIG. 1 is altered by replacing the transformer primary side voltage detectors 5U, 5V, and 5W with transformer secondary side voltage detectors 5T and 5M.

The two transformer secondary side voltage detectors 5T and 5M are measuring instruments configured to respectively measure the terminal voltages of the terminals (of the main and teaser sections) on the secondary side of the modified Woodbridge connection transformer 3. The transformer secondary side voltage detectors 5T and 5M are instrument voltage transformers, for example. The transformer secondary side voltage detectors 5T and 5M output detection values, as detection signals, to the excitation inrush current suppression device 6B.

The excitation inrush current suppression device 6B is configured such that the excitation inrush current suppression device 6 according to the first embodiment shown in FIG. 1 is altered by replacing the transformer voltage measurement unit 603 with a transformer voltage measurement unit 603B, replacing the residual magnetic flux calculation unit 604 with a residual magnetic flux calculation unit 604B, and adding a transformer voltage conversion unit 610. In all other respects, this device 6B is the same in structure as that according to the first embodiment.

Based on detection signals detected by the transformer secondary side voltage detectors 5T and 5M, the transformer voltage measurement unit 603B measures the secondary side voltages Vt and Vm of the two sections of the modified Woodbridge connection transformer 3. The secondary side voltage Vm is the secondary side voltage of the main section (the voltage between the terminals "c" and "a"). The secondary side voltage Vt is the secondary side voltage of the teaser section (the voltage between the terminals "b" and "d"). The transformer voltage measurement unit 603B outputs the secondary side voltages Vt and Vm of the two sections thus measured to the transformer voltage conversion unit 610.

The transformer voltage conversion unit 610 converts the single-phase AC voltages Vt and Vm of the two sections measured by the transformer voltage measurement unit 603B to primary side phase voltages VDu, VDv, and VDw by use of the following formulas. The primary side phase voltage VDu is the U-phase voltage after conversion. The primary side phase voltages VDv is the V-phase voltage after conversion. The primary side phase voltage VDw is the W-phase voltage after conversion. The transformer voltage conversion unit 610 outputs the primary side phase voltages VDu, VDv, and VDw thus converted to the residual magnetic flux calculation unit 604B.

$$VDu = (1/\sqrt{3})Vt \qquad (1)$$

$$VDv = (1/2) \times (Vm - (1/\sqrt{3})Vt) \qquad (2)$$

$$VDw = -(1/2) \times (Vm + (1/\sqrt{3})Vt) \qquad (3)$$

It should be noted that $1/\sqrt{3}$ can be replaced with 0.577 and ½ can be replaced with 0.5.

Next, with reference to FIGS. 20 to 22, an explanation will be given of an arithmetic process performed by the transformer voltage conversion unit 610 according to this embodiment.

Figure 20:
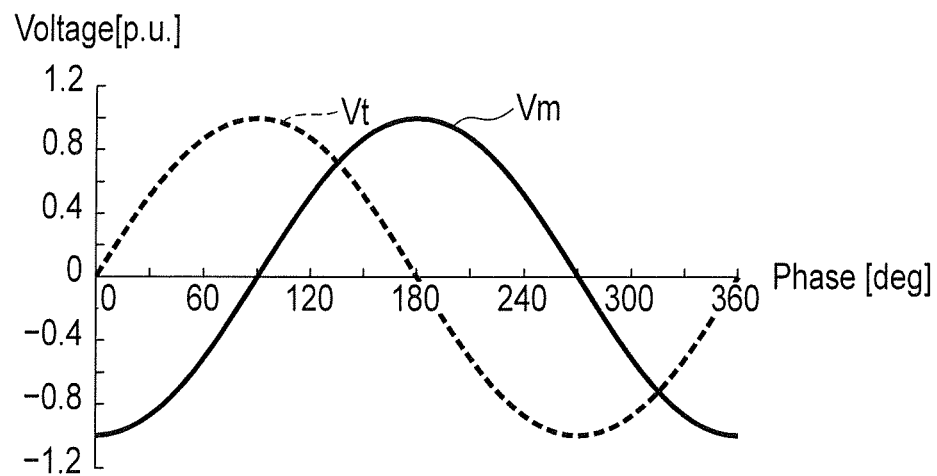
FIG. 20 is a waveform diagram showing the voltage waveforms of the secondary side voltages of two sections measured by a transformer voltage measurement unit according to the third embodiment.

FIG. 20 is a waveform diagram showing the voltage waveforms of the secondary side voltages Vt and Vm of the two sections measured by the transformer voltage measurement unit 603B. FIG. 21 is a waveform diagram showing the voltage waveforms of the primary side phase voltages VDu, VDv, and VDw converted by the transformer voltage conversion unit 610. FIG. 22 is a waveform diagram showing the voltage waveforms of the primary side phase voltages Vu, Vv, and Vw.

Figure 21:
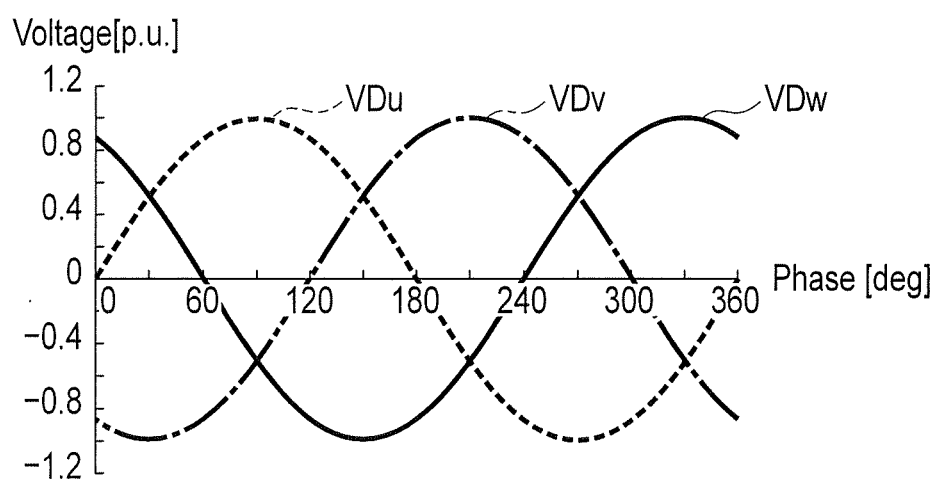
FIG. 21 is a waveform diagram showing the voltage waveforms of the primary side phase voltages after conversion by a transformer voltage conversion unit according to the third embodiment.
Figure 22:
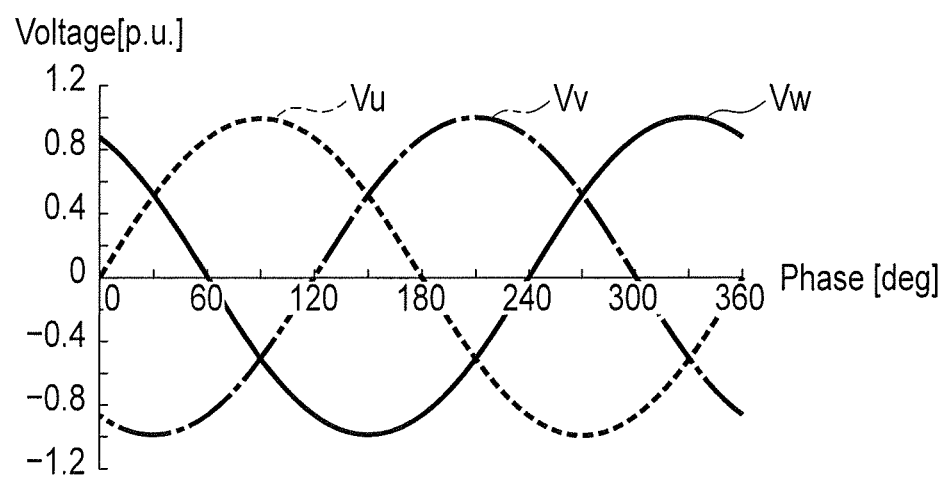
FIG. 22 is a waveform diagram showing the voltage waveforms of the primary side phase voltages according to the third embodiment.

The transformer voltage conversion unit 610 converts the secondary side voltages Vt and Vm of the two sections shown in FIG. 20 to the primary side phase voltages VDu, VDv, and VDw shown in FIG. 21. Consequently, the transformer voltage conversion unit 610 can obtain voltage waveforms the same as those of the primary side phase voltages Vu, Vv, and Vw shown in FIG. 22 by conversion into a pu value (the ratio relative to the rated value).

The residual magnetic flux calculation unit 604B integrates each of the phase voltages VDu, VDv, and VDw converted by the transformer voltage conversion unit 610, before and after the modified Woodbridge connection transformer 3 is shut off by the breaker 2. Based on the integrated values, the residual magnetic flux calculation unit 604B calculates residual magnetic fluxes present in the iron core of the modified Woodbridge connection transformer 3 (primary side phase magnetic fluxes) φZu, φZv, and φZw. The residual magnetic flux calculation unit 604B outputs the residual magnetic fluxes φZu, φZv, and φZw thus calculated to the phase detection unit 605.

As in the first embodiment, the phase detection unit 605 identifies a closing target phase region Tc based on the prospective magnetic fluxes φTu, φTv, and φTw of the respective phases calculated by the prospective magnetic flux calculation unit 602 and the residual magnetic fluxes φZu, φZv, and φZw of the respective phases calculated by the residual magnetic flux calculation unit 604B.

According to this embodiment, even if the modified Woodbridge connection transformer 3 is equipped only with the transformer secondary side voltage detectors 5T and 5M, it can provide the same functions and effects as the first embodiment by conversion from the secondary side voltages Vt and Vm of the modified Woodbridge connection transformer 3 to the primary side phase voltages VDu, VDv, and VDw thereof.

Fourth Embodiment

Figure 23:
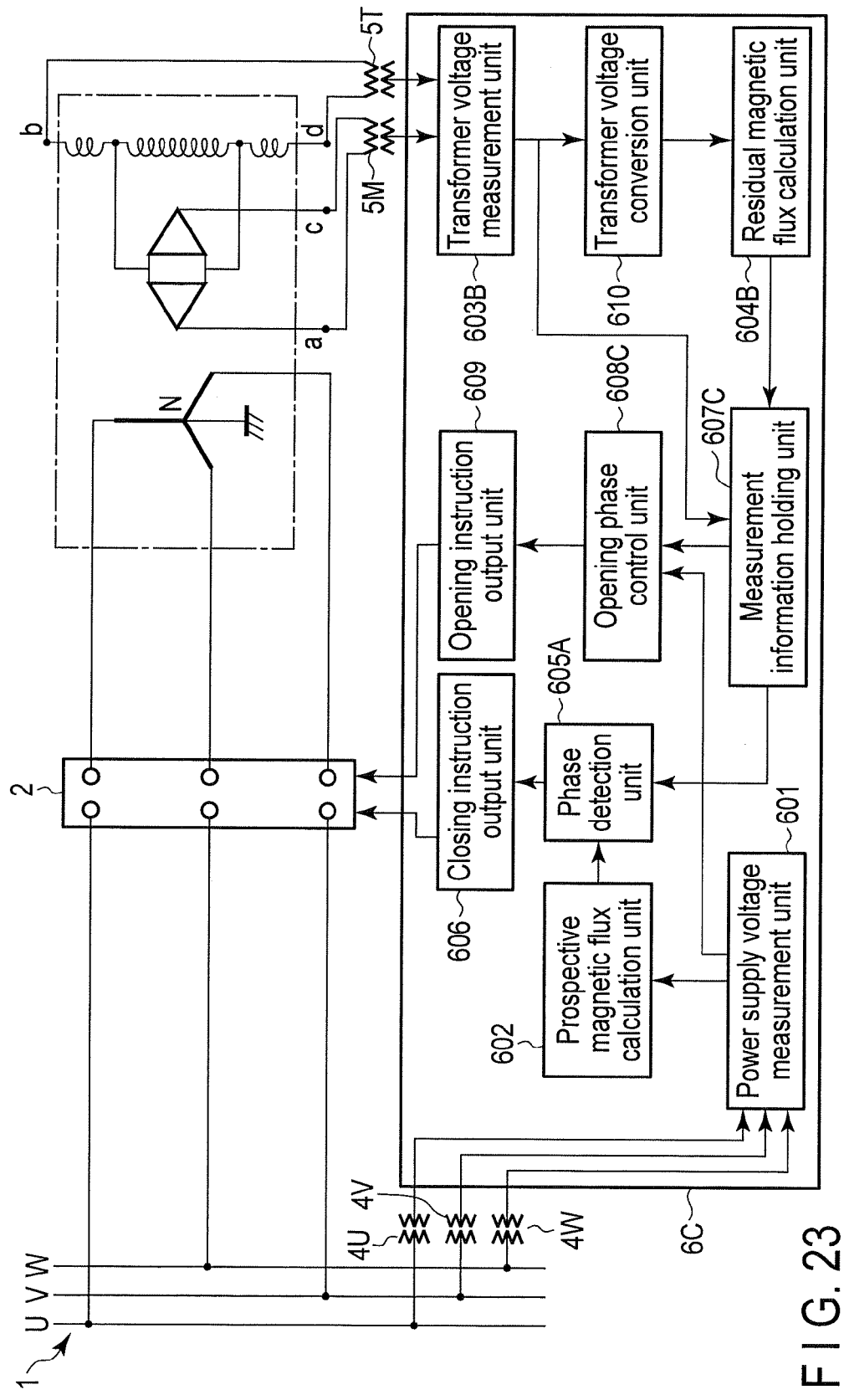
FIG. 23 is a block diagram showing the configuration of an electric power system to which an excitation inrush current suppression device according to a fourth embodiment of the present invention is applied.

FIG. 23 is a block diagram showing the configuration of an electric power system to which an excitation inrush current suppression device 6C according to a fourth embodiment of the present invention is applied.

The excitation inrush current suppression device 6C is configured such that the excitation inrush current suppression device 6B according to the third embodiment shown in FIG. 19 is altered by replacing the phase detection unit 605 with the phase detection unit 605A according to the second embodiment and adding a measurement information holding unit 607C, an opening phase control unit 608C, and the opening instruction output unit 609 according to the second embodiment. In all other respects, this device 6C is the same in structure as the excitation inrush current suppression device 6B according to the third embodiment.

Before the excitation inrush current suppression device 6C is placed in operation, the measurement information holding unit 607C measures the voltage shutoff phase positions of the secondary side voltages Vm and Vt measured by the transformer voltage measurement unit 603B, and magnetic flux signals calculated by the residual magnetic flux calculation unit 604B, in a case where the breaker 2 is shut off a plurality of times. Based on the voltage shutoff phase positions and the magnetic flux signals thus measured, the measurement information holding unit 607C holds information concerning the characteristics of residual magnetic fluxes φZu, φZv, and φZw, such as the relationship between the shutoff phase positions and the residual magnetic fluxes, as measurement information.

The opening phase control unit 608C receives inputs about the measurement information held in the measurement information holding unit 607C and the respective phase voltages Vu, Vv, and Vw of the power supply bus bar 1 measured by the power supply voltage measurement unit 601. Based on the respective phase voltages Vu, Vv, and Vw, the opening phase control unit 608C controls the opening phase positions of the main contacts of the breaker 2 to cause the shutoff phase positions to be constantly the same. The opening phase control unit 608C outputs the opening phase positions thus controlled to the opening instruction output unit 609.

The opening instruction output unit 609 receives the opening phase positions from the opening phase control unit 608C, and, based thereon, outputs opening instructions to the operation mechanism for driving the main contacts of the breaker 2. Consequently, the breaker 2 is set open.

Based on the measurement information held in the measurement information holding unit 607C and the prospective magnetic fluxes φTu, φTv, and φTw calculated by the prospective magnetic flux calculation unit 602, the phase detection unit 605A identifies a closing target phase region Tc for closing the breaker 2, as in the second embodiment.

This embodiment provides functions and effects the same as the functions and effects respectively provided by the second embodiment and the third embodiment.

Fifth Embodiment

FIG. 24 is a block diagram showing the configuration of an electric power system to which an excitation inrush current suppression device 6D according to a fifth embodiment of the present invention is applied.

The excitation inrush current suppression device 6D is configured such that the excitation inrush current suppression device 6B according to the third embodiment shown in FIG. 19 is altered by replacing the transformer voltage conversion unit 610 with a power supply voltage conversion unit 611, replacing the prospective magnetic flux calculation unit 602 with a prospective magnetic flux calculation unit 602D, replacing the residual magnetic flux calculation unit 604B with a residual magnetic flux calculation unit 604D, and replacing the phase detection unit 605 with a phase detection unit 605D. In all other respects, this device 6D is the same in structure as that according to the third embodiment.

Figure 25:
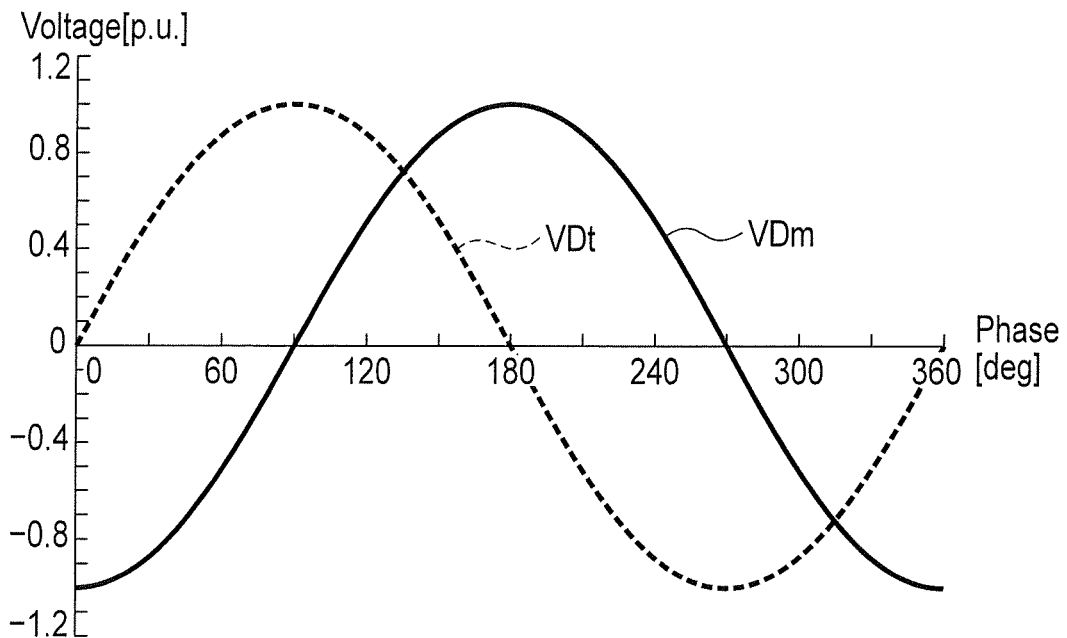
FIG. 25 is a waveform diagram showing the voltage waveforms of the secondary side voltages of the modified Woodbridge connection transformer before conversion by a power supply voltage conversion unit according to the fifth embodiment.
Figure 26:
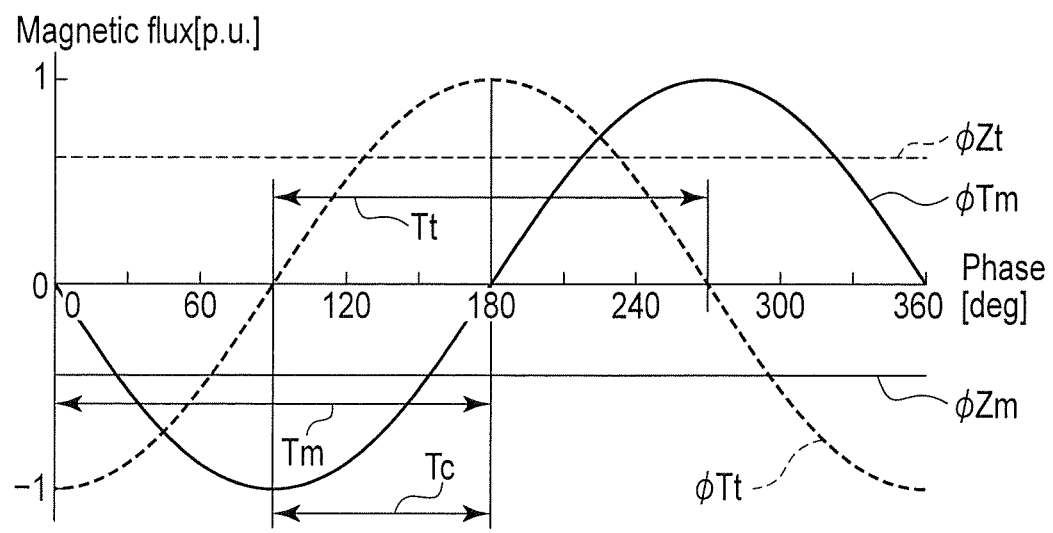
FIG. 26 is a waveform diagram showing magnetic flux waveforms to explain a closing target phase region associated with the excitation inrush current suppression device according to the fifth embodiment.

FIG. 25 is a waveform diagram showing the voltage waveforms of the secondary side voltages VDm and VDt of the modified Woodbridge connection transformer 3 after conversion by the power supply voltage conversion unit 611 according to this embodiment. FIG. 26 is a waveform diagram showing magnetic flux waveforms to explain a closing target phase region Tc associated with the excitation inrush current suppression device 6D according to this embodiment.

With reference to FIGS. 24 to 26, the configuration of the excitation inrush current suppression device 6D will be explained.

The residual magnetic flux calculation unit 604D integrates each of the secondary side voltages Vt and Vm of the two sections measured by the transformer voltage measurement unit 603B before and after the modified Woodbridge connection transformer 3 is shut off by the breaker 2. Based on the integrated values, the residual magnetic flux calculation unit 604D calculates residual magnetic fluxes present in the iron core of the modified Woodbridge connection transformer 3 (secondary side magnetic fluxes) φZm and φZt. The residual magnetic flux φZm is the secondary side residual magnetic flux of the main section. The residual magnetic flux φZt is the secondary side residual magnetic flux of the teaser section. The residual magnetic flux calculation unit 604D outputs the residual magnetic fluxes φZm and φZt thus calculated to the phase detection unit 605D.

Next, with reference to FIGS. 27 to 29, an explanation will be given of an arithmetic process performed by the power supply voltage conversion unit 611 according to this embodiment.

Figure 27:
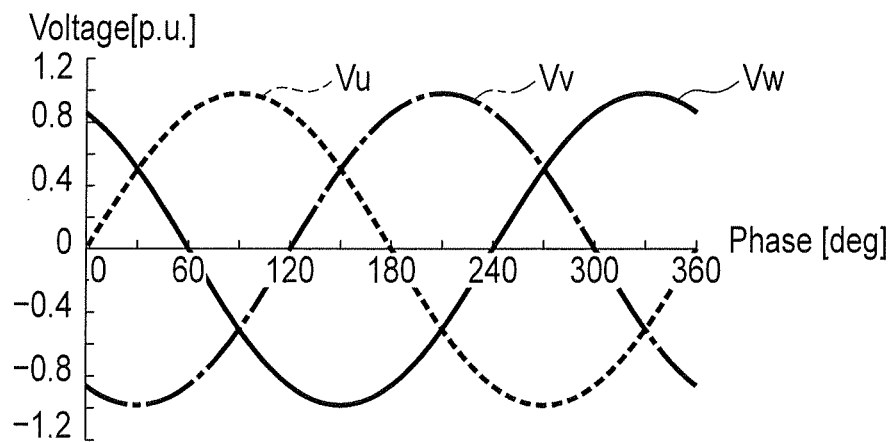
FIG. 27 is a waveform diagram showing the voltage waveforms of the respective phase voltages before conversion by a power supply voltage conversion unit according to the fifth embodiment.

FIG. 27 is a waveform diagram showing the voltage waveforms of the respective phase voltages Vu, Vv, and Vw before conversion by the power supply voltage conversion unit 611. FIG. 28 is a waveform diagram showing the voltage waveforms of the secondary side voltages VDm and VDt of the modified Woodbridge connection transformer 3 after conversion by the power supply voltage conversion unit 611. FIG. 29 is a waveform diagram showing the voltage waveforms of the secondary side voltages Vm and Vt of the modified Woodbridge connection transformer 3.

Figure 28:
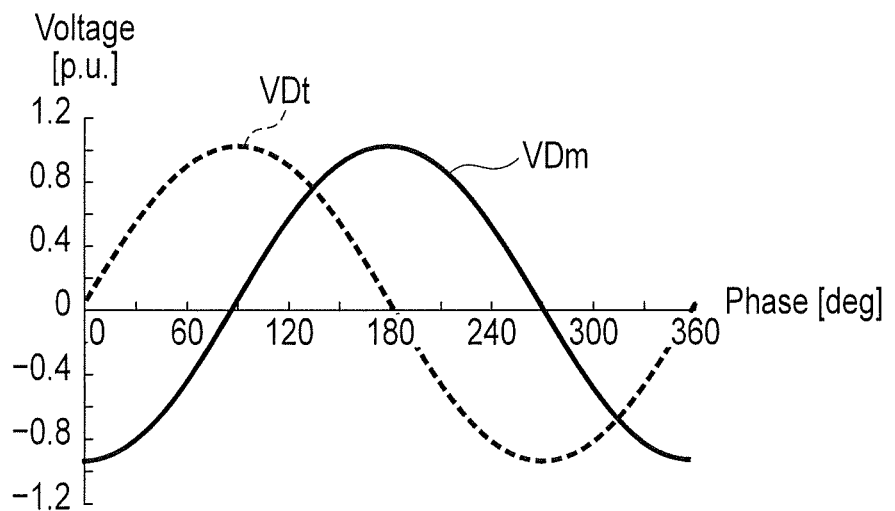
FIG. 28 is a waveform diagram showing the voltage waveforms of the secondary side voltages of the modified Woodbridge connection transformer after conversion by the power supply voltage conversion unit according to the fifth embodiment.

The power supply voltage conversion unit 611 converts the respective phase voltages Vu, Vv, and Vw, shown in FIG. 27, measured by the power supply voltage measurement unit 601 to the secondary side voltages VDm and VDt, shown in FIG. 28, of the two sections of the modified Woodbridge connection transformer 3 by use of the following formulas.

$$VDm = Vv - Vw \quad (4)$$

$$VDt = \sqrt{3} \times Vu \quad (5)$$

It should be noted that √3 can be replaced with 1.732.

The secondary side voltage VDm is the secondary side voltage of the main section after conversion. The secondary side voltage VDt is the secondary side voltage of the teaser section after conversion.

Figure 29:
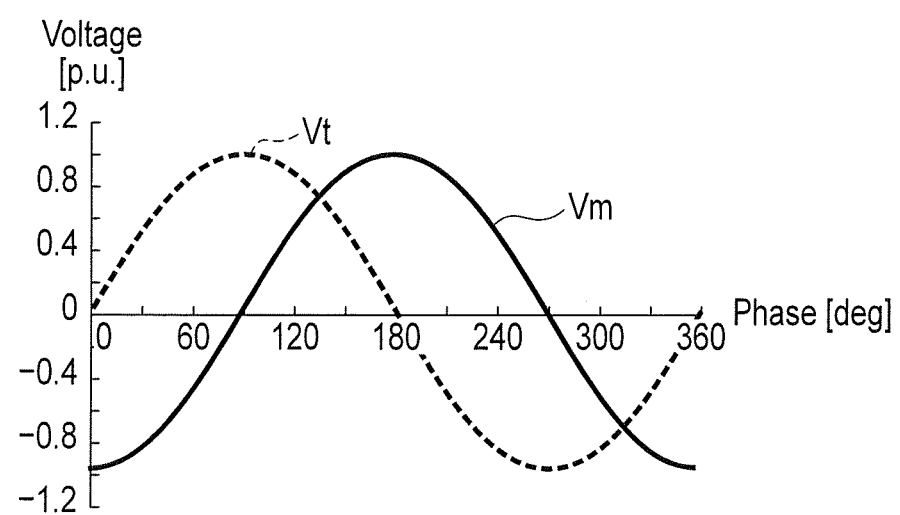
FIG. 29 is a waveform diagram showing the voltage waveforms of the secondary side voltages of the modified Woodbridge connection transformer according to the fifth embodiment.

Consequently, power supply voltage conversion unit 611 can obtain voltage waveforms the same as those of the secondary side voltages Vm and Vt of the two sections shown in FIG. 29 by conversion into a pu value (the ratio relative to the rated value). The power supply voltage conversion unit 611 outputs the secondary side voltages VDm and VDt of the two sections of the modified Woodbridge connection transformer 3 thus converted to the prospective magnetic flux calculation unit 602D.

The prospective magnetic flux calculation unit 602D integrates each of the secondary side voltages VDm and VDt of the two sections converted by the power supply voltage conversion unit 611. Based on the integrated values, the prospective magnetic flux calculation unit 602D calculates prospective magnetic fluxes φTm and φTt. The prospective magnetic flux calculation unit 602D outputs the prospective magnetic fluxes φTm and φTt thus calculated to the phase detection unit 605D. Consequently, the prospective magnetic fluxes φTm and φTt shown in FIG. 26 are derived from the secondary side voltages VDm and VDt of the two sections shown in FIG. 25.

As shown in FIG. 26, the phase detection unit 605D detects phase zones Tm and Tt for the respective inter-terminal portions on the secondary side in which the prospective magnetic fluxes φTm and φTt calculated by the prospective magnetic flux calculation unit 602D and the residual magnetic fluxes φZm and φZt calculated by the residual magnetic flux calculation unit 604D respectively agree with each other in polarity. The phase detection unit 605D identifies a zone Tc in which the detected two phase zones Tm and Tt overlap with each other. This identified zone Tc is a closing target phase region for closing the breaker 2. The phase detection unit 605D outputs the closing target phase region (zone) Tc thus detected to the closing instruction output unit 606.

The closing instruction output unit 606 outputs a closing instruction Tc1, within the closing target phase region Tc detected by the phase detection unit 605D, to the operation mechanism for driving the main contacts of the breaker 2. Consequently, the breaker 2 is set closed.

Next, with reference to FIGS. 30 to 32, an explanation will be given of suppression of excitation inrush currents by use of the excitation inrush current suppression device 6D.

Figure 30:
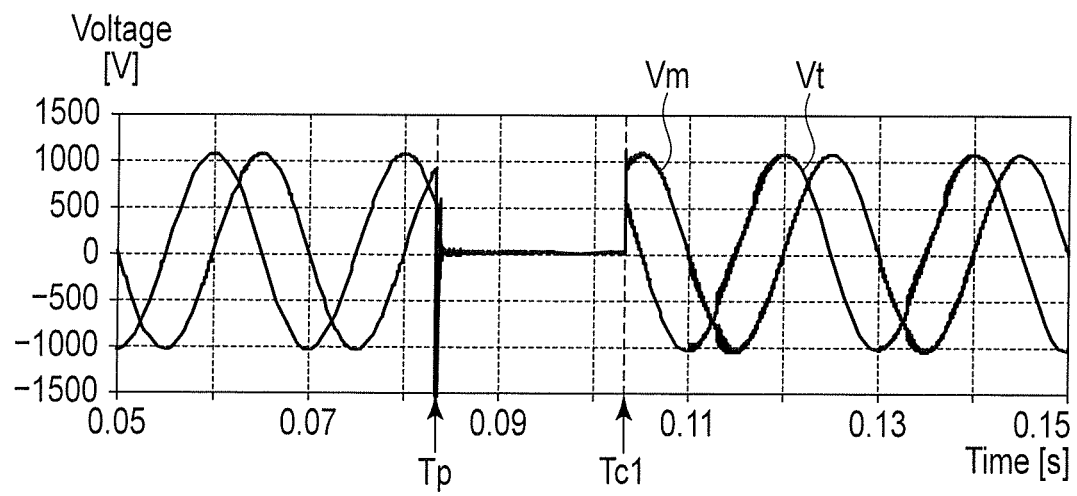
FIG. 30 is a waveform diagram showing the secondary side voltages of the modified Woodbridge connection transformer during a period from its shutoff to activation by a breaker according to the fifth embodiment.
Figure 31:
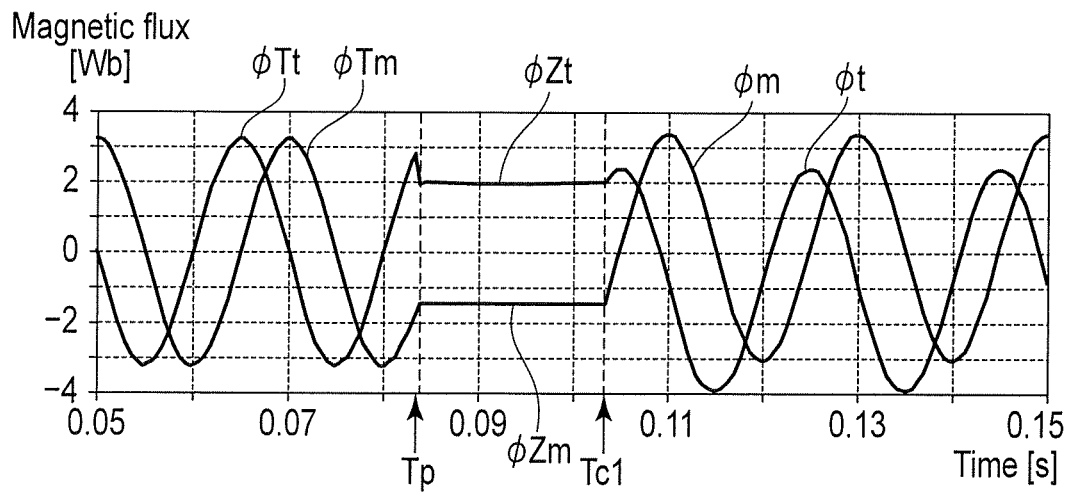
FIG. 31 is a waveform diagram showing the secondary side magnetic fluxes of the modified Woodbridge connection transformer during a period from its shutoff to activation by the breaker according to the fifth embodiment.
Figure 32:
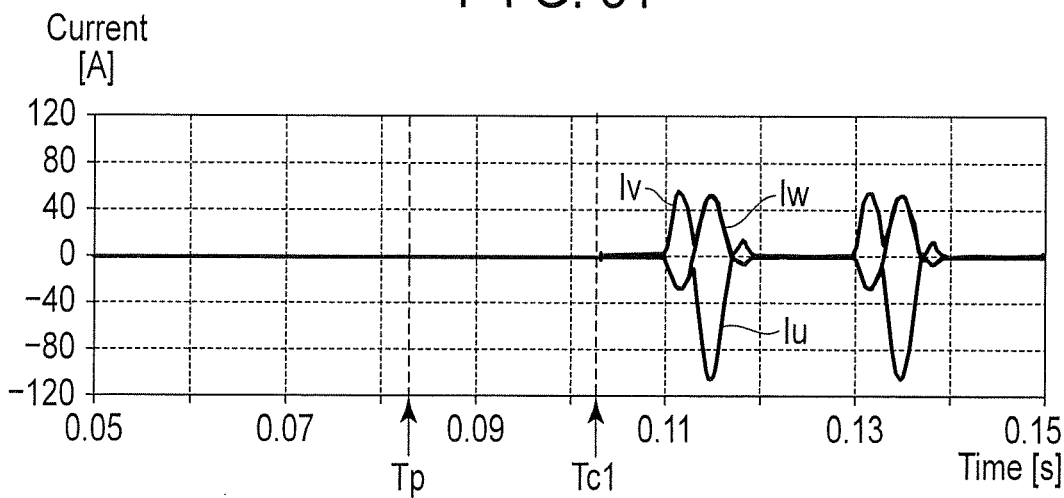
FIG. 32 is a waveform diagram showing the primary side phase currents of the modified Woodbridge connection transformer during a period from its shutoff to activation by the breaker according to the fifth embodiment.

FIGS. 30 to 32 show an example of the states of the modified Woodbridge connection transformer 3 during a period from its shutoff Tp to activation (by a closing instruction Tc1) by the breaker 2. FIG. 30 is a waveform diagram showing the secondary side voltages Vm and Vt. FIG. 31 is a waveform diagram showing the secondary side magnetic fluxes $\phi$m and $\phi$t (prospective magnetic fluxes $\phi$Tm and $\phi$Tt and residual magnetic fluxes $\phi$Zm and $\phi$Zt). FIG. 32 is a waveform diagram showing the primary side phase currents (excitation inrush currents) Iu, Iv, and Iw.

In a case where the secondary side voltages Vm and Vt shown in FIG. 30 are applied to the secondary side of the modified Woodbridge connection transformer 3, the residual magnetic fluxes $\phi$Zm and $\phi$Zt shown in FIG. 31 are present after the shutoff Tp by the breaker 2.

When the breaker 2 is set closed by the excitation inrush current suppression device 6D within the closing target phase region Tc, the excitation inrush currents Iu, Iv, and Iw shown in FIG. 32 are caused to flow. These excitation inrush currents Iu, Iv, and Iw are suppressed to be about 100 [A] at maximum.

According to this embodiment, the prospective magnetic fluxes $\phi$Tm and $\phi$Tt of the secondary side magnetic fluxes of the two sections of the modified Woodbridge connection transformer 3 are obtained from the three-phase AC voltages Vu, Vv, and Vw of the power supply bus bar 1. Thus, by measuring the secondary side voltages Vm and Vt of the modified Woodbridge connection transformer 3 and thereby obtaining the residual magnetic fluxes $\phi$Zm and $\phi$Zt, it is possible to identify a closing target phase region Tc for closing the breaker 2.

Accordingly, even if the modified Woodbridge connection transformer 3 is equipped only with the transformer secondary side voltage detectors 5T and 5M, it can perform phase position control to suppress the excitation inrush currents Iu, Iv, and Iw respectively flowing in the three phases.

Sixth Embodiment

Figure 33:
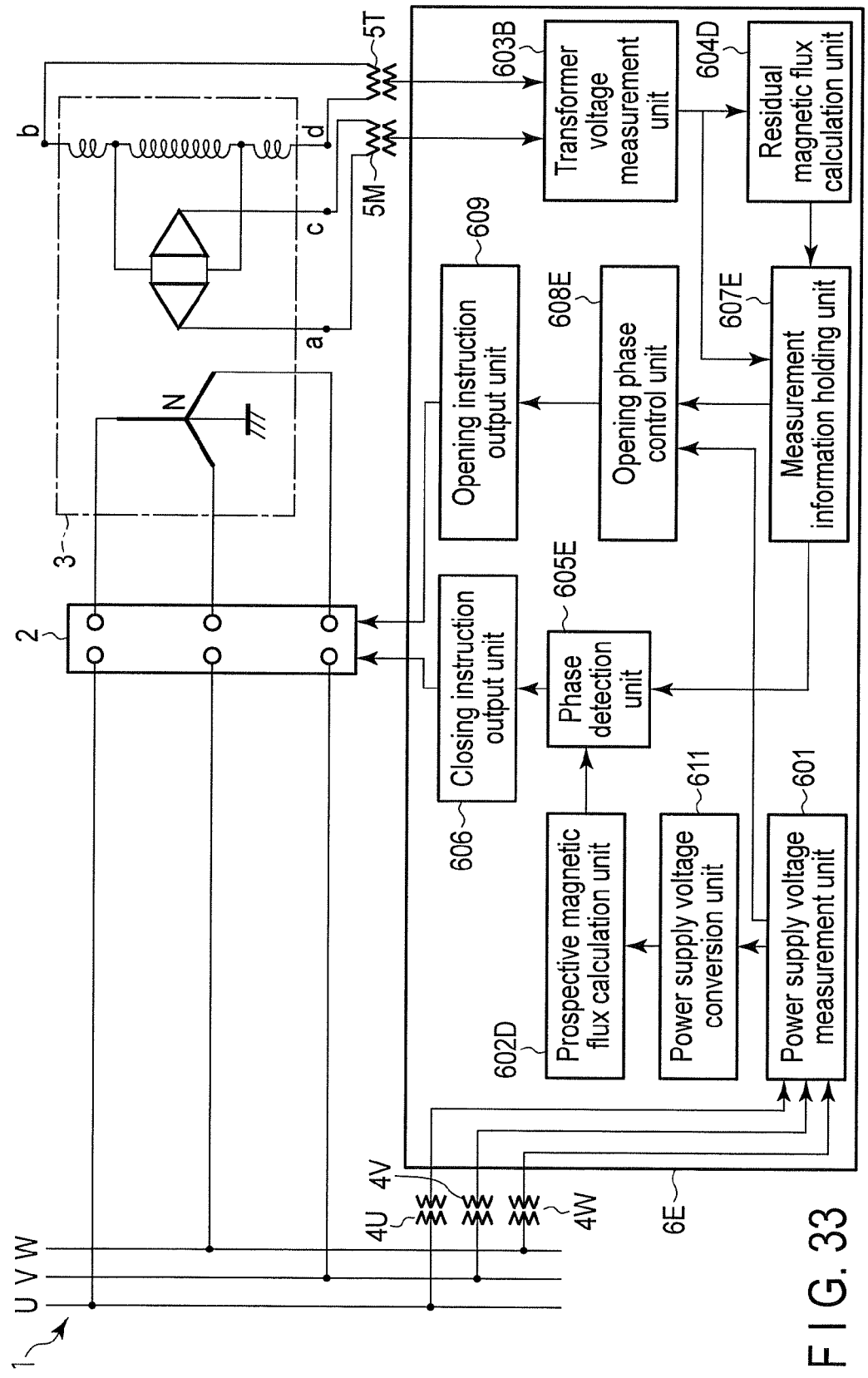
FIG. 33 is a block diagram showing the configuration of an electric power system to which an excitation inrush current suppression device according to a sixth embodiment of the present invention is applied.

FIG. 33 is a block diagram showing the configuration of an electric power system to which an excitation inrush current suppression device 6E according to a sixth embodiment of the present invention is applied.

The excitation inrush current suppression device 6E is configured such that the excitation inrush current suppression device 6D according to the fifth embodiment shown in FIG. 24 is altered by replacing the phase detection unit 605D with a phase detection unit 605E and adding a measurement information holding unit 607E, an opening phase control unit 608E, and the opening instruction output unit 609 according to the second embodiment. In all other respects, this device 6E is the same in structure as that according to the fifth embodiment.

Before the excitation inrush current suppression device 6E is placed in operation, the measurement information holding unit 607E measures the voltage shutoff phase positions of the secondary side voltages Vm and Vt measured by the transformer voltage measurement unit 603B, and magnetic flux signals calculated by the residual magnetic flux calculation unit 604D, in a case where the breaker 2 is shut off a plurality of times. Based on the voltage shutoff phase positions and the magnetic flux signals thus measured, the measurement information holding unit 607E holds information concerning the characteristics of residual magnetic fluxes $\phi$Zm and $\phi$Zt, such as the relationship between the shutoff phase positions and the residual magnetic fluxes, as measurement information.

Based on the measurement information held in the measurement information holding unit 607E and the respective phase voltages Vu, Vv, and Vw of the power supply bus bar 1 measured by the power supply voltage measurement unit 601, the opening phase control unit 608E controls the opening phase positions of the main contacts of the breaker 2 to cause the shutoff phase positions to be constantly the same. The opening phase control unit 608E outputs the opening phase positions thus controlled to the opening instruction output unit 609.

The opening instruction output unit 609 receives the opening phase positions from the opening phase control unit 608E, and, based thereon, outputs opening instructions to the operation mechanism for driving the main contacts of the breaker 2. Consequently, the breaker 2 is set open.

The phase detection unit 605E receives inputs about the measurement information held in the measurement information holding unit 607E and the prospective magnetic fluxes $\phi$Tm and $\phi$Tt of the secondary side magnetic fluxes of the modified Woodbridge connection transformer 3 calculated by the prospective magnetic flux calculation unit 602D. From the measurement information held in the measurement information holding unit 607E, the phase detection unit 605E estimates residual magnetic fluxes $\phi$Zm and $\phi$Zt. Based on the residual magnetic fluxes $\phi$Zm and $\phi$Zt and the prospective magnetic fluxes $\phi$Tm and $\phi$Tt, the phase detection unit 605E identifies a closing target phase region Tc for closing the breaker 2. The method for identifying the closing target phase region Tc is the same as that in the fifth embodiment.

In this case, the opening phase control unit 608E performs phase position control to cause the shutoff phase positions to be constantly the same. Accordingly, as long as the information held in the measurement information holding unit 607E is not changed (i.e., the measurement information is not renewed), the phase detection unit 605E can constantly use the same closing target phase region Tc.

This embodiment provides functions and effects the same as the functions and effects respectively provided by the fifth embodiment and second embodiment.

In the respective embodiments described above, the respective phase voltages of the power supply bus bar 1 are measured by the power supply voltage detectors 4U, 4V, and 4W, but the respective line voltages of the power supply bus bar 1 may be measured, alternatively. By converting the respective line voltages to the phase voltages, it is possible to attain the arrangements according to the respective embodiments.

Further, in the respective embodiments, various parameters used for the phase position control in the excitation inrush current suppression device 6 and so forth may be compensated to improve the accuracy. For example, when a breaker 2 is set closed, the closing time fluctuates due to an advanced discharge called "pre-arc" generated between the main contacts and due to an operational fluctuation of the operation mechanism. In order to compensate for the closing fluctuation due to the pre-arc and the other breaker closing fluctuation, their characteristics are checked in advance and then used for performing the phase position control. Such compensation makes it possible to more reliably suppress excitation inrush currents in spite of these fluctuations.

Further, in the respective embodiments, when the prospective magnetic fluxes and residual magnetic fluxes are calculated, conversion is first performed from phase voltages to various voltages, such as winding wire voltages, and calculation is then performed to obtain magnetic fluxes, but this may be modified such that calculation is first performed to obtain magnetic fluxes and conversion is then performed on these magnetic fluxes. For example, when the three-phase AC voltages Vu, Vv, and Vw on the primary side are used to derive the winding wire magnetic fluxes φm and φt of the two sections on the secondary side, an operation may be performed to first obtain the respective phase magnetic fluxes and then obtain the respective winding wire magnetic fluxes on the secondary side. Further, in other arithmetic operations, as long as the results are the same, the order of arithmetic operations and units for performing arithmetic operations (computer, various detectors, and so forth, regardless of the outside and inside of the excitation inrush current suppression device) may be suitably modified.

Further, in the respective embodiments, the breaker 2 is a breaker of the three-phase collective operation type, but it may be replaced with breakers of the single-phase operation type for operating the respective phases. When the breakers of the single-phase operation type are used, the breakers for the respective phases are set closed together simultaneously, so that they can provide the same functions and effects as the breaker of the three-phase collective operation type.

While certain embodiments according to the present invention have been described, these embodiments have been presented by way of example only, and are not intended to limit the scope of the invention. The novel embodiments described herein may be implemented in a variety of other forms, and various omissions, substitutions, and/or changes may be made therein without departing from the spirit of the inventions. The accompanying claims and their equivalents are intended to cover such forms or modifications as would fall within the scope and spirit of the inventions.

What is claimed is:

1. An excitation inrush current suppression device for suppressing excitation inrush currents flowing through a breaker for opening and closing connection between a three-phase AC power system including a power supply and an effectively grounded transformer that converts a three-phase AC voltage to single-phase AC voltages, the device comprising:
   a transformer-side single-phase AC voltage measurement unit configured to measure single-phase AC voltages on a transformer-side of the breaker;
   a transformer voltage conversion unit configured to convert the single-phase AC voltages measured by the transformer-side single-phase AC voltage measurement unit to respective phase voltages of three-phase AC;
   a residual magnetic flux calculation unit configured to perform calculation, based on the respective phase voltages of three-phase AC obtained by the transformer voltage conversion unit, to calculate residual magnetic fluxes of three phases of the transformer after the transformer is shut off by the breaker;
   a power supply-side three-phase AC voltage measurement unit configured to measure a three-phase AC voltage on a power supply-side of the breaker;
   a prospective magnetic flux calculation unit configured to perform calculation, based on the three-phase AC voltage measured by the power supply-side three-phase AC voltage measurement unit, to calculate prospective magnetic fluxes of the three phases of the transformer;
   a phase position determination unit configured to determine a phase position at which polarities of the prospective magnetic fluxes of the three phases calculated by the prospective magnetic flux calculation unit respectively agree with polarities of the residual magnetic fluxes of the three phases calculated by the residual magnetic flux calculation unit in all of the three phases respectively; and
   a closing unit configured to set the breaker closed, for the three phases all together, at the phase position determined by the phase position determination unit.

2. An excitation inrush current suppression device for suppressing excitation inrush currents flowing through a breaker for opening and closing connection between a three-phase AC power system including a power supply and an effectively grounded transformer that converts a three-phase AC voltage to single-phase AC voltages of two sections, the device comprising:
   a transformer-side single-phase AC voltage measurement unit configured to measure single-phase AC voltages on a transformer-side of the breaker;
   a residual magnetic flux calculation unit configured to perform calculation, based on the single-phase AC voltages measured by the transformer-side single-phase AC voltage measurement unit, to calculate residual magnetic fluxes of single phases of the transformer after the transformer is shut off by the breaker;
   a power supply-side three-phase AC voltage measurement unit configured to measure respective phase voltages of three-phase AC on a power supply-side of the breaker;
   a power supply voltage conversion unit configured to convert the respective phase voltages of three-phase AC measured by the power supply-side three-phase AC voltage measurement unit to single-phase AC voltages;
   a prospective magnetic flux calculation unit configured to perform calculation, based on the single-phase AC voltages obtained by the power supply voltage conversion unit, to calculate prospective magnetic fluxes of the single phases of the transformer;
   a phase position determination unit configured to determine a phase position at which polarities of the prospective magnetic fluxes of the single phases calculated by the prospective magnetic flux calculation unit respectively agree with polarities of the residual magnetic fluxes of the single phases calculated by the residual magnetic flux calculation unit in both of the single phases of the two sections respectively; and
   a closing unit configured to set the breaker closed, for the three phases all together, at the phase position determined by the phase position determination unit.

3. An excitation inrush current suppression method for suppressing excitation inrush currents flowing through a breaker for opening and closing connection between a three-phase AC power system including a power supply and an effectively grounded transformer that converts a three-phase AC voltage to single-phase AC voltages, the method comprising:
   measuring single-phase AC voltages on a transformer-side of the breaker;
   converting the measured single-phase AC voltages to respective phase voltages of three-phase AC;
   performing calculation, based on the respective phase voltages of three-phase AC obtained in the converting, to calculate residual magnetic fluxes of three phases of the transformer after the transformer is shut off by the breaker;

measuring a three-phase AC voltage on a power supply-side of the breaker;

performing calculation, based on the measured three-phase AC voltage on the power supply-side, to calculate prospective magnetic fluxes of the three phases of the transformer;

determining a phase position at which polarities of the calculated prospective magnetic fluxes of the three phases respectively agree with polarities of the calculated residual magnetic fluxes of the three phases in all of the three phases respectively; and setting the breaker closed, for the three phases all together, at the phase position determined in the determining.

4. An excitation inrush current suppression method for suppressing excitation inrush currents flowing through a breaker for opening and closing connection between a three-phase AC power system including a power supply and an effectively grounded transformer that converts a three-phase AC voltage to single-phase AC voltages of two sections, the method comprising:

measuring single-phase AC voltages on a transformer-side of the breaker;

performing calculation, based on the measured single-phase AC voltages on the transformer-side, to calculate residual magnetic fluxes of single phases of the transformer after the transformer is shut off by the breaker;

measuring respective phase voltages of three-phase AC on a power supply-side of the breaker;

converting the measured respective phase voltages of three-phase AC to single-phase AC voltages;

performing calculation, based on the single-phase AC voltages obtained in the conversion, to calculate prospective magnetic fluxes of the single phases of the transformer;

determining a phase position at which polarities of the calculated prospective magnetic fluxes of the single phases of the transformer respectively agree with polarities of the calculated residual magnetic fluxes of the single phases of the transformer in both of the single phases of the two sections respectively; and setting the breaker closed, for the three phases all together, at the phase position determined in the determining.

* * * * *